United States Patent
Marmen et al.

(10) Patent No.: US 11,647,733 B2
(45) Date of Patent: May 16, 2023

(54) ANIMAL WEARABLE DEVICES, SYSTEMS, AND METHODS

(71) Applicant: Barttron Inc., Havre de Grace, MD (US)

(72) Inventors: Jared Scott Marmen, Bel Air, MD (US); Brandon Matthew Jennings, Summerville, SC (US); Ray W. Breslau, Orinda, CA (US); Joshua Thomas Merchlinski, Bel Air, MD (US)

(73) Assignee: Barttron, Inc., Bel Air, MD (US)

( * ) Notice: Subject to any disclaimer, the term of this patent is extended or adjusted under 35 U.S.C. 154(b) by 353 days.

(21) Appl. No.: 15/350,993

(22) Filed: Nov. 14, 2016

(65) Prior Publication Data
US 2017/0135315 A1 May 18, 2017

Related U.S. Application Data

(60) Provisional application No. 62/255,828, filed on Nov. 16, 2015.

(51) Int. Cl.
*A01K 15/02* (2006.01)
*A01K 27/00* (2006.01)
(Continued)

(52) U.S. Cl.
CPC .......... *A01K 15/021* (2013.01); *A01K 27/001* (2013.01); *A01K 27/006* (2013.01);
(Continued)

(58) Field of Classification Search
USPC ....... 119/719, 712, 718, 720, 721, 856, 858, 119/859, 860, 908, 905
See application file for complete search history.

(56) References Cited

U.S. PATENT DOCUMENTS

| | | |
|---|---|---|
| 2,741,224 A | 4/1956 | Putnam |
| 3,827,403 A | 8/1974 | Meyer |

(Continued)

FOREIGN PATENT DOCUMENTS

| | | | |
|---|---|---|---|
| EP | 2362238 A1 * | 8/2011 | ............. G01S 11/14 |
| WO | WO2013184936 | 12/2013 | |
| WO | WO2014162154 | 10/2014 | |

OTHER PUBLICATIONS

Toward Cyber-Enhanced Working Dogs for Search and Rescue, Bozhurt et al., IEEE Computer Society, pp. 32-39, [retrieved from internet Jan. 4, 2021 https://ieeexplore.ieee.org/document/6914468/references#references] published 2014.*

(Continued)

*Primary Examiner* — Andrea M Valenti
(74) *Attorney, Agent, or Firm* — Wilson Patent Law, LLC

(57) ABSTRACT

Methods, systems, and device for animal wearable technology are provided in accordance with various embodiments. Some embodiments include an animal wearable device that includes: a securing apparatus configured to be worn by an animal; multiple stimulation components coupled with different portions of the securing apparatus; and/or a computerized controller coupled with the securing apparatus and the multiple stimulation components. The computerized controller may be configured to provide stimulation to the animal through the multiple stimulation components. The computerized controller may be configured to separately and/or independently control each stimulation components from the multiple stimulation components. Some embodiments include a method that includes: determining one or more signals at a computerized controller coupled with a securing apparatus configured to be worn by an animal; and/or activating, based on the one or more determined signals, one or more stimulation components from multiple (Continued)

stimulation components coupled with different portions of the securing apparatus.

27 Claims, 27 Drawing Sheets

(51) Int. Cl.
<table>
<tr><td>H04W 4/80</td><td>(2018.01)</td></tr>
<tr><td>H04R 1/02</td><td>(2006.01)</td></tr>
<tr><td>H04R 1/40</td><td>(2006.01)</td></tr>
</table>

(52) U.S. Cl.
CPC ............ *A01K 27/009* (2013.01); *H04R 1/028* (2013.01); *H04R 1/406* (2013.01); *H04R 2420/07* (2013.01); *H04W 4/80* (2018.02)

(56) References Cited

U.S. PATENT DOCUMENTS

<table>
<tr><td>4,919,082</td><td>A</td><td></td><td>4/1990</td><td>Tsai</td><td></td></tr>
<tr><td>5,054,428</td><td>A</td><td></td><td>10/1991</td><td>Farkus</td><td></td></tr>
<tr><td>5,207,178</td><td>A</td><td></td><td>5/1993</td><td>McDade</td><td></td></tr>
<tr><td>5,228,012</td><td>A</td><td></td><td>7/1993</td><td>Seager</td><td></td></tr>
<tr><td>5,241,923</td><td>A</td><td>*</td><td>9/1993</td><td>Janning</td><td>................ A01K 27/009<br>119/908</td></tr>
<tr><td>5,456,656</td><td>A</td><td></td><td>10/1995</td><td>Skovira</td><td></td></tr>
<tr><td>5,494,002</td><td>A</td><td></td><td>2/1996</td><td>Greene</td><td></td></tr>
<tr><td>5,749,324</td><td>A</td><td></td><td>5/1998</td><td>Moore</td><td></td></tr>
<tr><td>5,815,077</td><td>A</td><td></td><td>9/1998</td><td>Christiansen</td><td></td></tr>
<tr><td>D400,458</td><td>S</td><td></td><td>11/1998</td><td>Titus</td><td></td></tr>
<tr><td>5,857,433</td><td>A</td><td></td><td>1/1999</td><td>Files</td><td></td></tr>
<tr><td>5,911,198</td><td>A</td><td></td><td>6/1999</td><td>Curen</td><td></td></tr>
<tr><td>6,131,535</td><td>A</td><td></td><td>10/2000</td><td>So</td><td></td></tr>
<tr><td>6,167,843</td><td>B1</td><td></td><td>1/2001</td><td>Kim</td><td></td></tr>
<tr><td>6,271,757</td><td>B1</td><td></td><td>8/2001</td><td>Touchton</td><td></td></tr>
<tr><td>6,273,027</td><td>B1</td><td></td><td>8/2001</td><td>Watson</td><td></td></tr>
<tr><td>6,401,095</td><td>B1</td><td></td><td>6/2002</td><td>Adler</td><td></td></tr>
<tr><td>6,431,121</td><td>B1</td><td></td><td>8/2002</td><td>Mainini</td><td></td></tr>
<tr><td>D468,492</td><td>S</td><td></td><td>1/2003</td><td>Wilhelm</td><td></td></tr>
<tr><td>6,600,422</td><td>B2</td><td></td><td>7/2003</td><td>Barry</td><td></td></tr>
<tr><td>6,651,592</td><td>B2</td><td></td><td>11/2003</td><td>Maddox</td><td></td></tr>
<tr><td>6,900,731</td><td>B2</td><td></td><td>5/2005</td><td>Kreiner</td><td></td></tr>
<tr><td>6,903,682</td><td>B1</td><td></td><td>6/2005</td><td>Maddox</td><td></td></tr>
<tr><td>7,385,513</td><td>B2</td><td></td><td>6/2008</td><td>Everest</td><td></td></tr>
<tr><td>7,421,979</td><td>B2</td><td></td><td>9/2008</td><td>Kim</td><td></td></tr>
<tr><td>7,667,607</td><td>B2</td><td></td><td>2/2010</td><td>Gerig</td><td></td></tr>
<tr><td>7,705,736</td><td>B1</td><td></td><td>4/2010</td><td>Kedziora</td><td></td></tr>
<tr><td>7,770,541</td><td>B2</td><td></td><td>8/2010</td><td>Boyd</td><td></td></tr>
<tr><td>7,845,313</td><td>B1</td><td></td><td>12/2010</td><td>Yates</td><td></td></tr>
<tr><td>8,069,823</td><td>B2</td><td></td><td>12/2011</td><td>Mainini</td><td></td></tr>
<tr><td>8,543,134</td><td>B2</td><td>*</td><td>9/2013</td><td>Lopez</td><td>.................. A01K 15/021<br>455/411</td></tr>
<tr><td>8,851,019</td><td>B2</td><td></td><td>10/2014</td><td>Jesurum</td><td></td></tr>
<tr><td>8,854,215</td><td>B1</td><td></td><td>10/2014</td><td>Ellis</td><td></td></tr>
<tr><td>9,226,479</td><td>B2</td><td></td><td>1/2016</td><td>Bianchi</td><td></td></tr>
<tr><td>9,538,725</td><td>B2</td><td>*</td><td>1/2017</td><td>Bianchi</td><td>................ A01K 27/009</td></tr>
<tr><td>9,693,536</td><td>B1</td><td>*</td><td>7/2017</td><td>Dana</td><td>.................... A01K 15/023</td></tr>
<tr><td>9,943,066</td><td>B2</td><td></td><td>4/2018</td><td>Zhao</td><td></td></tr>
<tr><td>10,117,802</td><td>B2</td><td>*</td><td>11/2018</td><td>Kasravi</td><td>.................. A61H 3/061</td></tr>
<tr><td>10,251,371</td><td>B1</td><td>*</td><td>4/2019</td><td>Landers</td><td>............... A01K 15/023</td></tr>
<tr><td>2002/0046713</td><td>A1</td><td></td><td>4/2002</td><td>Otto</td><td></td></tr>
<tr><td>2004/0100386</td><td>A1</td><td></td><td>5/2004</td><td>Tendler</td><td></td></tr>
<tr><td>2005/0000469</td><td>A1</td><td>*</td><td>1/2005</td><td>Giunta</td><td>.................. A01K 15/023<br>119/721</td></tr>
<tr><td>2006/0027186</td><td>A1</td><td></td><td>2/2006</td><td>Giunta</td><td></td></tr>
<tr><td>2006/0219187</td><td>A1</td><td></td><td>10/2006</td><td>Krishnamurthy</td><td></td></tr>
<tr><td>2008/0035072</td><td>A1</td><td></td><td>2/2008</td><td>Lee</td><td></td></tr>
<tr><td>2008/0156277</td><td>A1</td><td></td><td>7/2008</td><td>Mainini</td><td></td></tr>
<tr><td>2008/0236513</td><td>A1</td><td>*</td><td>10/2008</td><td>Barlebo-Larsen</td><td>... A01K 15/021<br>119/719</td></tr>
<tr><td>2009/0038670</td><td>A1</td><td></td><td>2/2009</td><td>Shu</td><td></td></tr>
<tr><td>2009/0090305</td><td>A1</td><td>*</td><td>4/2009</td><td>Cheok</td><td>.................... A01K 15/02<br>119/707</td></tr>
<tr><td>2009/0102668</td><td>A1</td><td></td><td>4/2009</td><td>Thompson</td><td></td></tr>
<tr><td>2011/0215935</td><td>A1</td><td></td><td>9/2011</td><td>Zehavi</td><td></td></tr>
<tr><td>2011/0221597</td><td>A1</td><td></td><td>9/2011</td><td>Jameson</td><td></td></tr>
<tr><td>2013/0092099</td><td>A1</td><td></td><td>4/2013</td><td>Hardi</td><td></td></tr>
<tr><td>2013/0157628</td><td>A1</td><td></td><td>6/2013</td><td>Bryant</td><td></td></tr>
<tr><td>2013/0285815</td><td>A1</td><td></td><td>10/2013</td><td>Jones</td><td></td></tr>
<tr><td>2014/0261235</td><td>A1</td><td></td><td>9/2014</td><td>Rich et al.</td><td></td></tr>
<tr><td>2014/0352632</td><td>A1</td><td>*</td><td>12/2014</td><td>McLaughlin</td><td>........ A01K 11/008<br>119/721</td></tr>
<tr><td>2015/0020750</td><td>A1</td><td></td><td>1/2015</td><td>Jesurum</td><td></td></tr>
<tr><td>2015/0040839</td><td>A1</td><td></td><td>2/2015</td><td>Goetzl</td><td></td></tr>
<tr><td>2015/0325115</td><td>A1</td><td>*</td><td>11/2015</td><td>Wardle</td><td>.................. G08C 23/02<br>367/197</td></tr>
<tr><td>2016/0015004</td><td>A1</td><td>*</td><td>1/2016</td><td>Bonge, Jr.</td><td>............ A01K 29/005<br>119/718</td></tr>
<tr><td>2016/0144404</td><td>A1</td><td>*</td><td>5/2016</td><td>Houston</td><td>................ H02K 33/00<br>318/114</td></tr>
<tr><td>2016/0258758</td><td>A1</td><td>*</td><td>9/2016</td><td>Houston</td><td>................ G01C 21/20</td></tr>
<tr><td>2017/0055055</td><td>A1</td><td>*</td><td>2/2017</td><td>Albanese</td><td>............... H04R 1/028</td></tr>
<tr><td>2017/0094946</td><td>A1</td><td>*</td><td>4/2017</td><td>Giunta</td><td>.................. A01K 27/009</td></tr>
<tr><td>2017/0263032</td><td>A1</td><td>*</td><td>9/2017</td><td>Cheri</td><td>.................. A01K 15/021</td></tr>
</table>

OTHER PUBLICATIONS

International Search Report and Written Opinion for PCT/US2016/061984, dated Jan. 19, 2017, USPTO/ISA.

Golan, Y., et al. "A Vibrotactile Vest for Remote Human-Dog Communication," 2019 IEEE World Haptics Conference, Jul. 9-12, 2019.

* cited by examiner

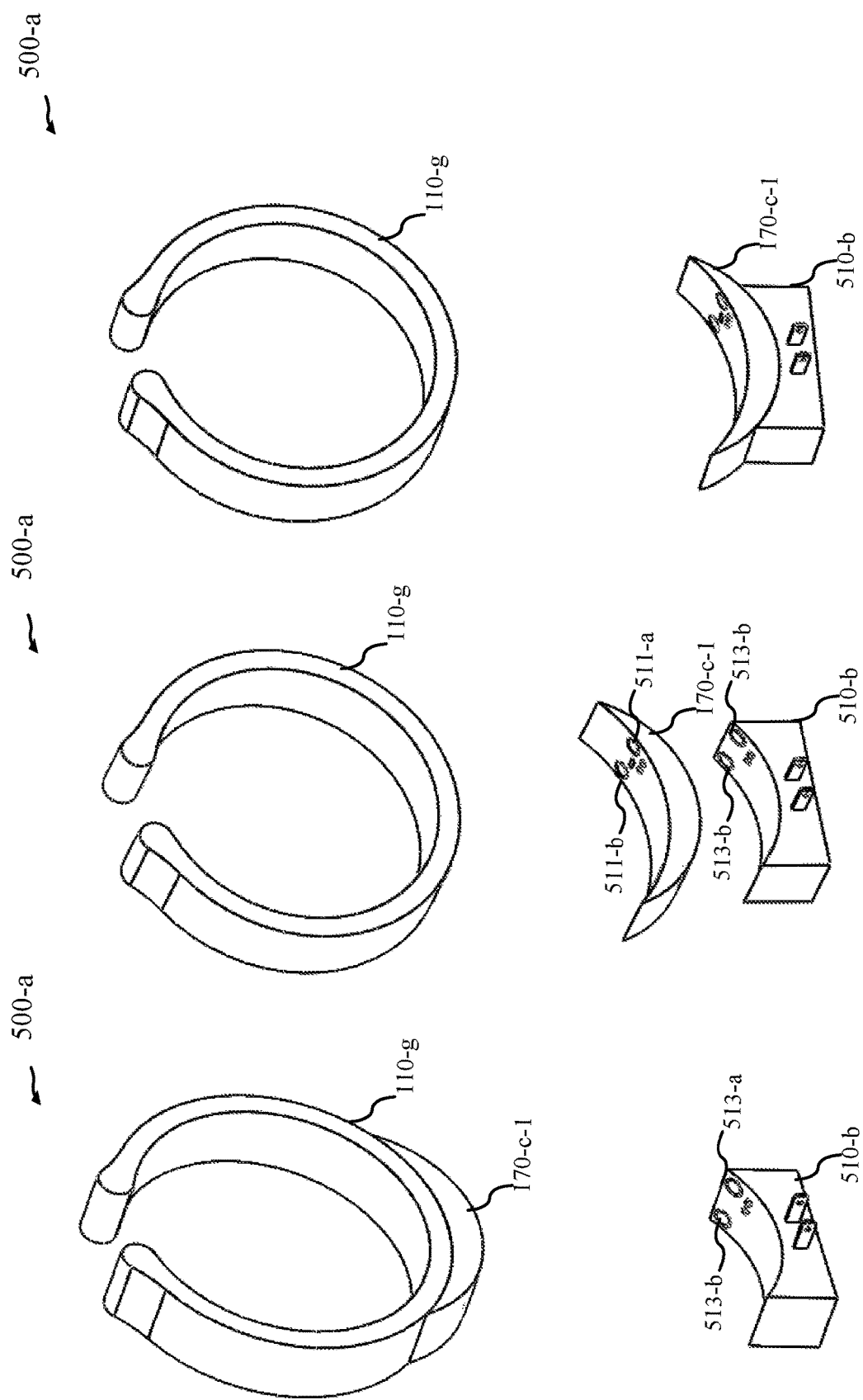

ANIMAL WEARABLE DEVICES, SYSTEMS, AND METHODS

CROSS REFERENCES TO RELATED APPLICATIONS

This application is a non-provisional patent application claiming priority benefit of U.S. provisional patent application Ser. No. 62/255,828, filed on Nov. 16, 2015 and entitled "ANIMAL WEARABLE TECHNOLOGY FOR TRAINING, CONTROLLING, AND PROTECTING ANIMALS," the entire disclosure of which is herein incorporated by reference for all purposes.

BACKGROUND

Conventional devices for training, controlling and/or protecting animals may generally include leashes, ropes, fences, electric shock collars, whistles, clickers, and the like. These devices may not integrate with technology that is now ubiquitous in the home (e.g., a computer), the pocket (e.g., a smart phone), and all around us (e.g., communication networks). Owners and caretakers of pets, service animals, or other domestic animals may suffer inconvenience and annoyance because animals are not connected to the digital world.

There may be a need for new tools and techniques to provide for animal training, control, protection, and/or other purposes.

SUMMARY

Methods, systems, and device for animal wearable technology are provided in accordance with various embodiments. The animal wearable technology may be utilized to provide for animal training, protection, control, and/or other purposes, for example.

Some embodiments include an animal wearable device that may include: a securing apparatus configured to be worn by an animal; multiple stimulation components coupled with different portions of the securing apparatus; and/or a computerized controller coupled with the securing apparatus and the multiple stimulation components. The computerized controller may be configured to provide stimulation to the animal through the multiple stimulation components. The computerized controller may be configured to separately and/or independently control each stimulation components from the multiple stimulation components.

In some embodiments, the multiple stimulation components include multiple vibration components. In some embodiments, the multiple stimulation components include multiple force components. In some embodiments, the multiple vibration and/or force components includes a first vibration and/or force component coupled with a first portion of the securing apparatus and a second vibration and/or force component coupled with a second portion of the securing apparatus such that the first portion and the second portion are configured to be on opposites sides of an animal, such as opposite sides of an animal neck or an animal torso.

In some embodiments, the stimulation components provide signals based on at least amplitude modulation, pulse duration, or pulse occurrence. In some embodiments, the multiple stimulation components are coordinated with each other so as to provide a pattern. The pattern may include vibrating out-of-phase at least two vibration components from the multiple simulation components on opposite sides of an animal.

Some embodiments include multiple microphones positioned on the securing apparatus such that at least a direction or a distance from a sound source may be determined with respect to the securing apparatus. In some embodiments, the multiple stimulation components include at least multiple light components or multiple sound components.

Some embodiments include one or more batteries coupled with the computerized controller such that the one or more batteries are configured to be at least charged or exchanged with respect to a charging device while the animal wearable device is worn by an animal.

Some embodiments include one or more location components coupled with the computerized controller. In some embodiments, the multiple stimulation components are coordinated with each other so as to provide a pattern based on a location determined with the one or more location components. Some embodiments include one or more motion components coupled with the computerized controller. The multiple stimulation components may be coordinated with each other so as to provide a pattern based on a motion determined with the one or more motion components.

In some embodiments, the securing apparatus includes an animal collar. In some embodiments, the computerized controller includes: a microprocessor; a memory; and/or wireless communication component configured at least to receive commands from a user device. The computerized controller may be further configured to wirelessly transmit feedback to the user device using the wireless communication component. In some embodiments, the computerized controller includes a smart phone.

Some embodiments include a method that may include: determining one or more signals at a computerized controller coupled with a securing apparatus configured to be worn by an animal; and/or activating, based on the one or more determined signals, one or more stimulation components from multiple stimulation components coupled with different portions of the securing apparatus. The multiple stimulation components may include multiple vibration and/or force components, for example.

In some embodiments, activating the one or more stimulation components provides directional cues. In some embodiments, activating the one or more stimulation components include activating the one or more stimulation components in a pattern.

In some embodiments, determining one or more signals includes determining multiple sound signals. Some embodiments include determining at least a distance or a direction to a sound source based on the determined multiple sound signals. Some embodiments include receiving the one or more signals from a user device.

Some embodiments include: determining one or more boundary conditions; determining whether the one or more boundary conditions are satisfied utilizing the one or more determined signals; and/or utilizing whether the one or more boundary conditions are satisfied to activate the one or more simulation components. In some embodiments, the one or more boundary conditions include one or more physical locations. In some embodiments, the one or more boundary conditions include one or more time conditions. In some embodiments, the one or more boundary conditions change over time. In some embodiments, the one or more determined signals include at least a position, velocity, acceleration, or orientation of the secured device with respect to the one or more boundary conditions.

In some embodiments, the multiple stimulation components include multiple light components. The multiple light components may be configured to project at least a light pattern or an image in a field of view of an animal wearing the securing apparatus. In some embodiments, the multiple stimulation components include multiple sound components.

In some embodiments, activating the one or more stimulation components directs the animal to a charging device. Some embodiments include charging one or more batteries coupled with the computerized controller while holding the securing device with respect to the charging device. Some embodiments include exchanging one or more batteries coupled with the computerized controller while holding the securing device with respect to the charging device.

Some embodiments include methods, systems, and/or devices as described in the detailed description and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5A, FIG. 5B, FIG. 5C, FIG. 5D, FIG. 5E, FIG. 5F, and FIG. 5G show systems and/or devices in accordance with various embodiments.

DETAILED DESCRIPTION

Figure 1A:
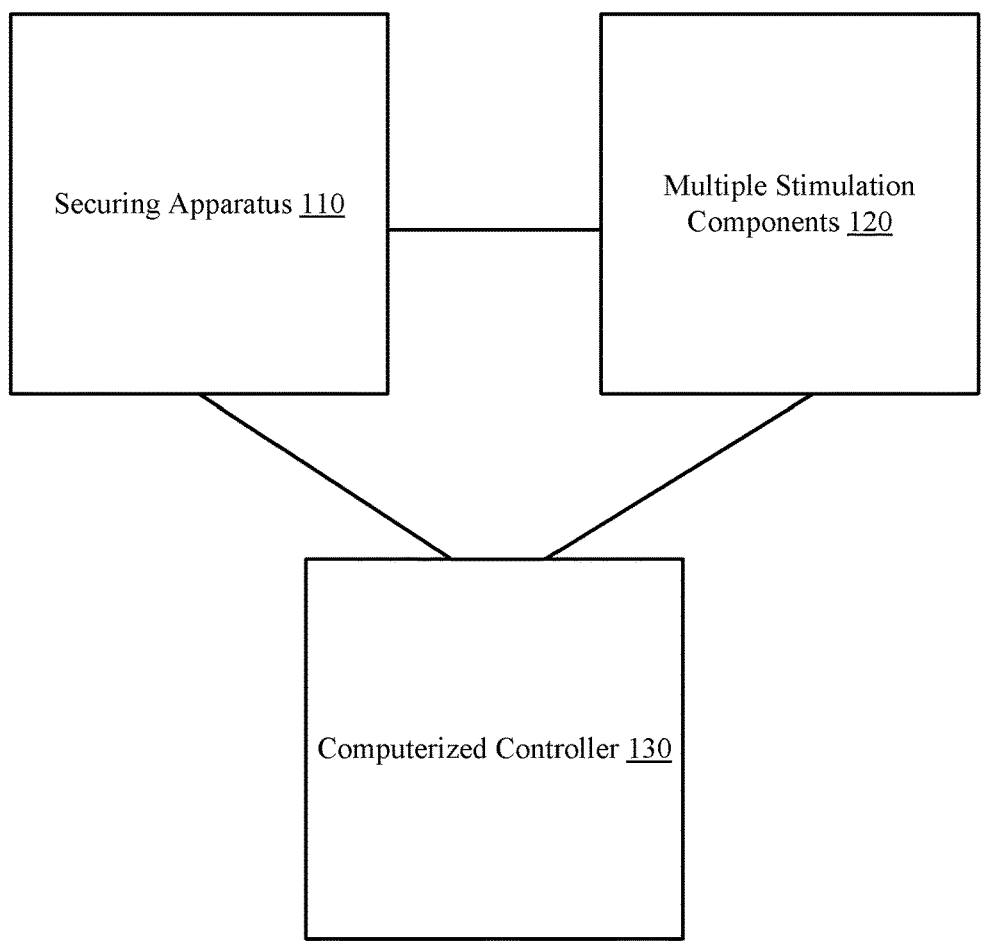
FIG. 1A, FIG. 1B, FIG. 1C, and FIG. 1D show animal wearable devices in accordance with various embodiments.

This description provides embodiments, and is not intended to limit the scope, applicability or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Devices, systems, and methods for animal wearable technology are provided in accordance with various embodiments. These devices, systems, and methods may provide for training, controlling, and protecting animals, for example. More particularly, some embodiments relate to animal wearable technology usable for animal training, animal tracking, animal communications, animal research, animal welfare, and service animal aids. The devices, systems, and methods may provide for other purposes.

The variety of embodiments may provide many benefits and improvements over other systems, devices, and methods. For example, animal training may be performed more efficiently and conveniently by allowing the training to occur with the trainer positioned at a distance from the animal, but with the animal hearing the commands and receiving the stimuli as if the trainer is right next to the animal. Another benefit and/or improvement may be potentially quicker learning by the animal due to the positioning, coordination, and/or individualization of the stimuli. Another benefit and/or improvement may be the enhanced ability to keep an animal within a boundary and/or to locate a lost animal. Another benefit and/or improvement may be the ability to provide virtual animal walker technology. Another benefit and/or improvement may be the ability to charge and/or replace batteries without human interaction. Other benefits, advantages, and/or improvements may also be obtained in the variety of embodiments provided.

In some embodiments, information may be collected from an animal and communicated to a human, and directions can be communicated from the human to the animal. For example, motion, location, health, sound, and/or visual information may be collected and communicated back to the human or to web services and directions to turn, follow a path, perform a learned task, etc. may be communicated to the animal. In some embodiments, haptic feedback is used to provide the commands, which may include precise directional commands for heading, speed, and/or orientation.

In some embodiments, the communications from the animal to the human and vice versa is accomplished using a single device. Some embodiments provide a capability for providing two-way communication with an animal with precision and flexibility. In some embodiments, the communication is performed using a conventional mobile device, such as a smart phone.

A benefit of some embodiments may include providing an efficient and convenient animal training platform. During animal training, for example, voice and other commands may typically be presented to an animal to perform particular tasks. Various stimuli may be presented to the animal along with the commands so the animal can associate the stimuli with the requested task. After a training period, the animal may generally learn to perform the task in response to the stimuli. The commands and stimuli may be typically presented to the animal from close range. Some embodiments allow the training to occur with the trainer, owner, or other party positioned at a distance from the animal, but with the animal hearing the commands and/or receiving the stimuli as if the trainer is right next to the animal.

Another benefit may include potentially quicker learning by the animal. In some embodiments, stimuli may be given on different sides of the animal so as to make it easier for the animal to learn certain tasks, such as moving in the direction from which the stimulus was given. In addition, the multiple stimuli may be coordinated and/or individualized.

Another benefit may include an enhanced ability to keep an animal within a boundary and/or to find a lost animal. In some embodiments, the animal may be warned when outside of a predetermined boundary, even a boundary having three-dimensions. The boundary may be selectively movable so that the system may be used as a virtual animal walker. A signal may be sent to an owner when the animal is outside of the boundary.

The tools and techniques provided may provide a wide variety of other benefits. Those benefits described above merely provide examples of some of the possible benefits of some embodiments.

Turning now to FIG. 1A, an animal wearable device 100 is provided in accordance with various embodiments. The device 100 may include a securing apparatus 110 that may be configured to be worn by an animal; for example, the securing apparatus 110 may be configured to be securely affixed to an animal. For example, securing apparatus 110 may take the form of a collar that can be worn around an animal's neck. Other types of securing apparatuses are also possible. By way of example and not limitation, the securing apparatus 110 may be: a collar that may be worn as a band about the neck, limbs, or other body part of the animal; a harness that may wrap around one or more limbs and/or the torso of the animal; a bridle or other similar harness that may be positioned on the head of the animal; or an attachment to an apparatus already worn by the animal. For ease of discussion, the securing apparatus 110 discussed herein is generally directed to a banded collar wearable about the neck, except as specifically noted.

The animal wearable device 100 may include multiple stimulation components 120. The multiple stimulation components may include a variety of components such as vibration and/or force components. These multiple stimulation components 120 may be utilized to provide information to an animal wearing the animal wearable device 100 for a variety of reasons, including, but not limited to, training, controlling, and/or protecting the animal. Through the use of multiple stimulation components 120, an animal may be provided more information than mere binary communication (on/off), as may be provided by other devices such as shock collars. The multiple stimulation components 120 may be positioned on different portions of the securing apparatus 110. Some embodiments may utilize other stimulation components 120, such as lights and/or speakers.

The animal wearable device 100 also may include a computerized controller 130 secured to the securing apparatus 110. The computerized controller 130 may be coupled with the multiple stimulation devices 120 such that they may be separated and/or independently controlled. The computerized controller 130 may be used to control the animal wearable device 100, including, but not limited to, determining the type and location of stimulation to be passed to the animal as well as obtaining feedback and sensor information from the animal. The computerized controller 130 also may control the manner in which the stimulation and feedback may be passed. The computerized controller 130 may also include communication functionality for transmitting and receiving information between the animal wearable device 100 and an external device used by a human, such as a trainer or owner, for example. The computerized controller 130 can include one or more processors, memory, controllers, data input/output ports, transmitters, receivers, and the like. Hardware and software can be used to cause the computerized controller 130 to perform its different functions.

The computerized controller 130 may utilize a variety of technologies constructed in part using components such as batteries, microprocessors, graphics processors, flash memory, cellular telephony, Wi-Fi, Bluetooth, Near Field Communication (NFC), Global Positioning System (GPS), Accelerometers, Gyroscopes, magnetometers, thermometers, lights, buttons, speakers, microphones, cameras, heart rate monitors, antennas, and ports including USB and other varieties. These components can be arranged and interconnected in a variety of ways. In addition, typical software can be used, where desired, in conjunction with these components. In some embodiments, the computerized controller 130 includes a conventional smart phone; see for example, FIG. 3.

In some embodiments, the multiple stimulation components 120 include multiple vibration components. In some embodiments, the multiple stimulation components 120 include multiple force components. In some embodiments, the multiple vibration and/or force components includes a first vibration and/or force component coupled with a first portion of the securing apparatus 110 and a second vibration and/or force component coupled with a second portion of the securing apparatus 110 such that the first portion and the second portion are configured to be on opposites sides of an animal, such as opposite sides of an animal's neck or torso.

In some embodiments, the multiple stimulation components 120 provide signals based on at least amplitude modulation, pulse duration, or pulse occurrence. In some embodiments, the multiple stimulation components 120 are coordinated with each other so as to provide a pattern. The pattern may include vibrating out-of-phase at least two vibration components from the multiple simulation components 120 on opposite sides of an animal.

Figure 1B:
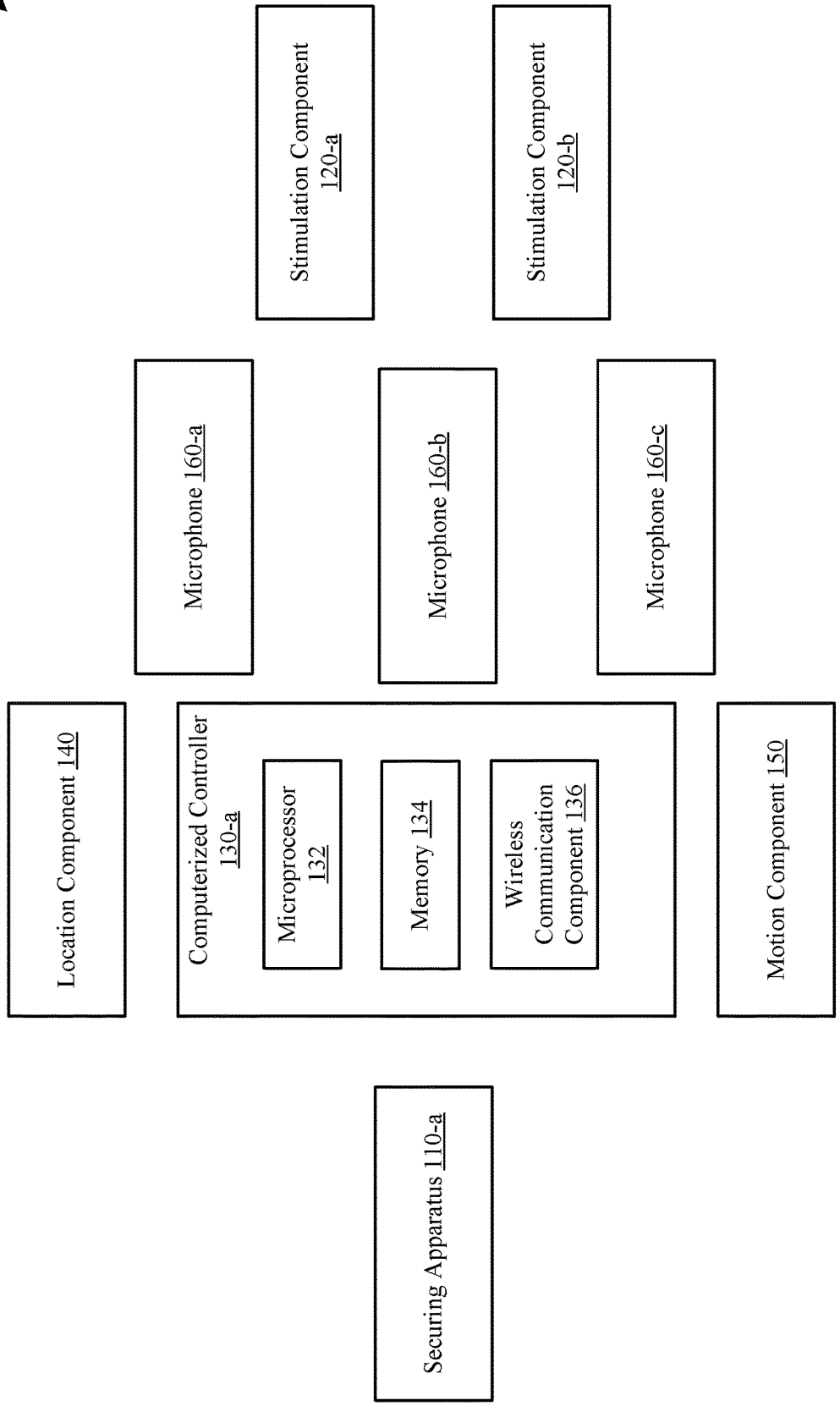
Figure 1C:
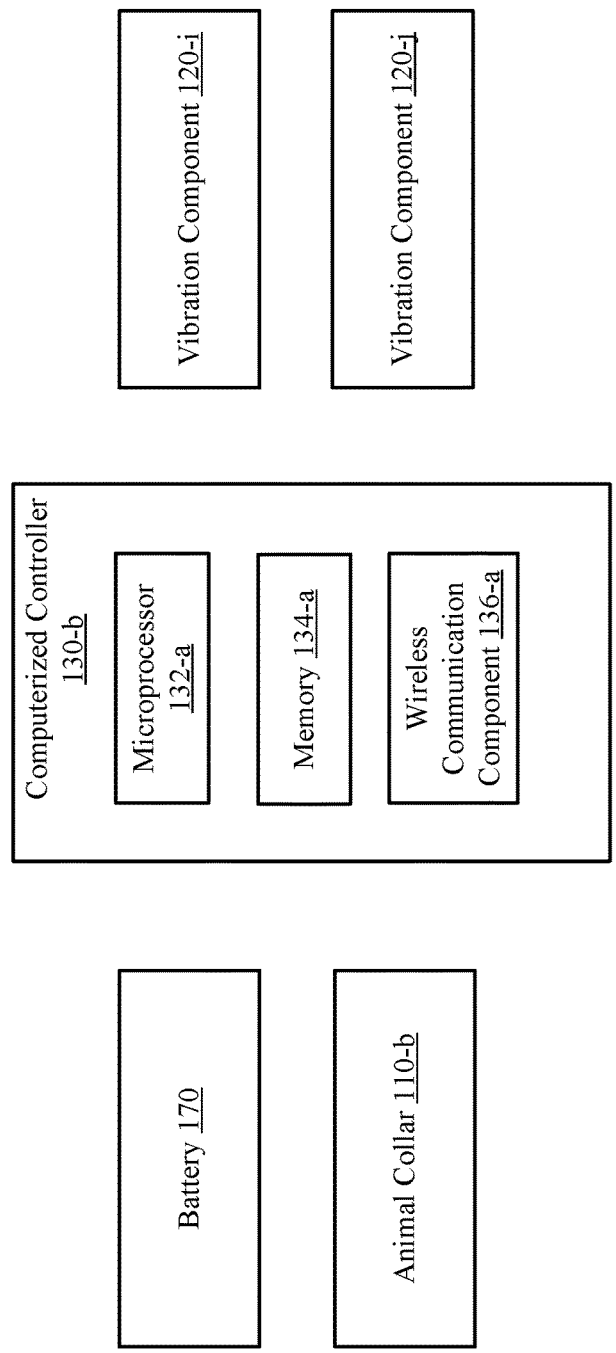
Figure 1D:
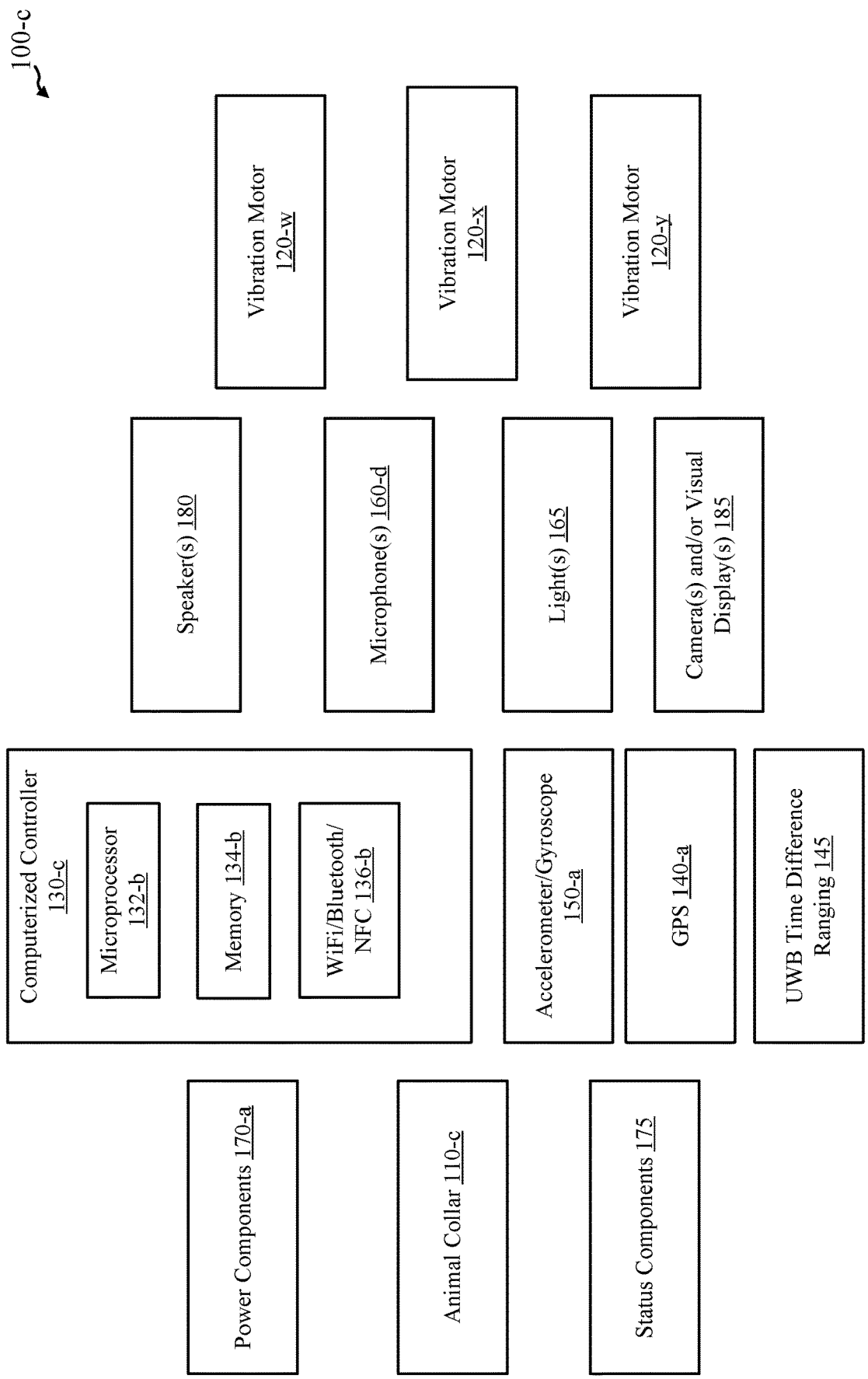

Some embodiments include multiple microphones (not shown) positioned on the securing apparatus 110 such that at least a direction or a distance from a sound source may be determined with respect to the securing apparatus; see FIG. 1B and/or FIG. 1D for examples a device 100 that may include microphones. In some embodiments, the multiple stimulation components 120 include at least multiple light components or multiple sound components.

Some embodiments include one or more batteries (not shown) coupled with the computerized controller 130 such that the one or more batteries are configured to be at least charged or exchanged with respect to a charging device while the animal wearable device is worn by an animal; see FIG. 1C and/or FIG. 1D for examples of device 100 with one or more batteries.

Some embodiments include one or more location components coupled with the computerized controller 130; location components may be part of computerized controller 130 or separate components in some embodiments; see FIG. 1B and/or FIG. 1D for additional example that may include location components. In some embodiments, the multiple stimulation components 120 are coordinated with each other so as to provide a pattern based on a location determined with the one or more location components. Some embodiments include one or more motion components coupled with the computerized controller 130; the one or more motion components may be part of computerized controller 130 or separate components; see FIG. 1B and/or FIG. 1D for examples that may include motion components. The multiple stimulation components 120 may be coordinated with each other so as to provide a pattern based on a motion determined with the one or more motion components.

In some embodiments, the securing apparatus 110 includes an animal collar. In some embodiments, the computerized controller 130 includes: a microprocessor; a memory; and/or wireless communication component configured at least to receive commands from a user device. The computerized controller 130 may be further configured to wirelessly transmit feedback to the user device using the wireless communication component. In some embodiments, the computerized controller 130 includes a smart phone.

FIG. 1B shows a specific example of animal wearable device 100-a in accordance with various embodiments. Device 100-a may be an example of device 100 of FIG. 1A. Device 100-a may include multiple simulation components 120-a/120-b; other embodiments may utilize more stimulation components. Device 100-a may include a computerized controller 130-a; computerized controller 130-a may include a microprocessor 132, a memory 134, and/or a wireless communication component 136. Device 100-a may include a securing apparatus 110-a. The securing apparatus 110-a may be coupled with the other components of device 100-a.

Device 100-a may include multiple microphones 160-a/160-b/160-c; other embodiments may include fewer microphones (such as one or two microphones), while other embodiments may include more microphones. In some embodiments, microphones 160-a/160-b/160-c may be configured to determine the direction and/or location of a sound source near the animal wearable device 100-a, such as through triangulation of the sound source.

Device 100-a may include additional components such as a location component 140 and/or a motion component 150. Location component 140 and/or motion component 150 may include components such as Global Positioning System (GPS) components, accelerometers, gyroscopes, and/or magnetometers. These components may determine location, orientation, speed, velocity, and/or acceleration information with respect to an animal wearing the animal wearable device 100-a.

FIG. 1C shows another specific example of animal wearable device 100-b in accordance with various embodiments. Device 100-b may be an example of device 100 of FIG. 1A and/or aspects of device 100-a of FIG. 1B. Device 100-b may include multiple vibration components 120-i/120-j; other embodiments may utilize more stimulation components. Device 100-b may include a computerized controller 130-b; computerized controller 130-b may include a microprocessor 132-a, a memory 134-a, and/or a wireless communication component 136-a. Device 100-a may include an animal collar 110-b and one or more batteries 170. The animal collar 110-b may be coupled with the other items to form the animal wearable device 100-b. In some embodiments, the battery 170 may be configured such that the battery 170 may be charged while an animal is wearing the animal wearable device 100-b. Battery 170 may be defined as a component capable of storing potential energy and releasing electrical energy. Battery 170 may be an electrochemical cell, a capacitor, an electrochemical capacitor, or other similar component.

FIG. 1D shows another specific example of animal wearable device 100-c in accordance with various embodiments. Device 100-c may be an example of device 100 of FIG. 1A, device 100-a of FIG. 1B, and/or device 100-b of FIG. 1C.

Device 100-c may include multiple stimulation components configured as vibration motors 120-w/120-x/120-y; other embodiments may utilize more or less stimulation components. Variations of device 100-c may utilize different stimulation components from vibration motors, such as force components (e.g., solenoids). Device 100-c may include a computerized controller 130-c; computerized controller 130-c may include a microprocessor 132-b, a memory 134-b, and/or a wireless communication component 136-b (such as WiFi, Bluetooth, NFC, cellular, and/or other wireless communication technology). Device 100-c may include an animal collar 110-c. Animal collar 110-c may be coupled with the other components of device 100-c.

Device 100-c may include location components and/or motion components such as accelerometer/gyroscope 150-a, GPS component 140-a, and/or UWB time difference ranging components 145. These components may determine location, orientation, speed, velocity, and/or acceleration information with respect to an animal wearing the animal wearable device 100-c.

Device 100-c may include power components 170-a that may supply power to the components of device 100-c. In some embodiments, the power components 170-a may be configured to recharge while the device 100-c is worn by an animal.

Device 100-c may include status components 175. The status components 175 may include components that may monitor a status of the animal, such as heart rate through the use of a heart rate monitor and/or temperature through the use of a thermometer. Device 100-c may also include one or more cameras and/or visual displays 185 that may be utilized to monitor the animal and its surroundings and/or to provide visual information at the location of the animal.

Device 100-c may include one or more microphones 160-d. In some embodiments, microphones 160-d may be utilized to monitor the sound environment of an animal wearing the animal wearable device 100-c and/or sounds may be the animal itself. In some embodiments, the microphones 160-d may be configured to determine the direction and/or location of a sound source near the animal wearable device 100-*c*, such as through triangulation or other time difference techniques.

Device 100-*c* may include one or more speakers 180. The one or more speakers 180 may be utilized to provide audio information to the animal wearing the device 100-*c*. One or more speakers 180 may also be utilized in some embodiments to provide audio information to other animals or humans near the animal wearing the device 100-*c*. Some embodiments may utilize multiple speakers 180 to act as multiple stimulation components 120. Device 100-*c* may include one or more lights 165. The one or more lights 165 may be configured as multiple stimulation components in some embodiments. One or more lights 165 may also be utilized to provide signals to other animals and/or humans near the animal wearing the device 100-*c*.

In some embodiments, the one or more speaker components 180 and/or the one or more microphone components 160-*d* may be used to train, protect, and/or control the animal, for example. In some embodiment, speaker(s) 180 and/or microphone(s) 160-*d* components are implemented to provide the signal characteristics for the particular type of animal to discern the different commands and/or feedback. For example, it may be desirable for the user to receive sounds made by the animal—such as barking or purring—or for the animal to receive loud verbal commands from the user, and the microphones and speakers can be utilized accordingly.

The use of sound through one or more speakers 180 may be combined with the use of other stimulation components 120, such as vibration motors and/or force components. Utilizing the multiple signals provided by the multiple different stimulation components may increase the numbers of different communication patterns that may be conveyed.

Speaker(s) 180 and/or microphone(s) 160-*d* may be configured specifically with respect to the hearing capabilities of the animal. For example, some embodiments may utilize speaker 180 and/or microphone 160-*d* components configured for sound in the ultrasonic range of cats and/or dogs. Some embodiments may be configured to detect ultrasonic sounds that may be distracting or harming the animal, for example.

In some embodiments, the speaker(s) 180 and/or microphone(s) 160-*d* components may be configured such that a human voice recorded cue/command may be played from the speaker on the collar along with an ultrasonic part that may be add based on transforming the recorded voice. In some embodiments, the ultrasonic part may be played with the haptic feedback. The ultrasonic part may be an indicator to the animal that the cue came from the collar and not the human. In some embodiments, a microphone component 160-*d* may be used to detect that an ultrasonic cue was actually made, which may verify the correct operation that cannot be verified by human ears, for example.

In some embodiment, the one or more microphone components 160-*d* may be utilized to receive voice commands at the animal wearable device 100-*c* that are clear enough to be translated into electronic commands (e.g., by voice recognition software, to generate proper vibration patterns and other responses). For example, controlling the behavior of an animal may utilize sound-processing selectively responsive to both human and animal vocalizations in which at least two microphones are used, where one microphone may be primarily intended to receive sounds from the animal and the other may be primarily intended to receive sounds generated by a source other than the animal, for example a human voice.

In some embodiments, a user may want to know from which direction sounds from the environment are coming. Multiple microphones components 160-*d* can be arranged on the animal wearable device 100-*c* in an arrangement that may allow the relative direction and/or distance from a sound source to be determined. For example, using three microphones 160-*d* arranged on collar 110-*c* in a particular arrangement, a voice can be detected (e.g., giving a voice command); see also FIG. 1B. The microphones 160-*d* may receive the voice at different intensities and/or at different instances of time. Using this information, the direction and/or distance of the voice may be determined. For example, the triangulated position due to the time of sound receipt and the amplitude may yield a relative position vector to the speaker. The type of voice may also be determined in some embodiments. For example, the sound may be determined to be a human voice, or even a child's voice. The sound may also be determined to be from a particular, known individual. In some embodiments, the multiple microphone components 160-*d*, voice recognition, and/or location determination of the sound origination combined with the determined location and orientation of the collar 110-*c* on the animal may allow for cues to be presented to the animal conditionally. In some embodiments, multiple microphones components 160-*d* may detect ultrasonic and subsonic sounds not detected by humans, which may allow for cues to be presented to the animal conditionally.

The animal wearable device 100-*c* may provide behavioral cues, instructions, and/or feedback to the animal via audio signals and haptic feedback. For example, the one or more speaker components 180 may provide audio signals that may be in the form of recorded or live voice commands or other sounds such as whistles or claps, or any combination. This may include using a common cueing sound before any command. Haptic feedback or other type of vibration or force may also be used to transmit information to the animal utilizing the vibration motors 120-*w*/120-*x*/120-*y*. The one or more speaker 180 and/or microphone 160-*d* components may be arranged in specific locations on the animal collar 110-*c*, to provide a directional context to communication and/or other sounds.

Similarly, visual light or images may also be used to provide behavioral cues, instructions, and/or feedback to the animal. For example, one or more lights 165 may be used in a variety of colors, patterns, or intensities. The use of multiple lights 165 may act as another form of multiple stimulation components 120. Images may also be projected from the animal wearable device 100-*c* into the field of vision of the animal. For example, multiple lights 165 and/or visual display 185 configured as a projector may be utilized.

Figure 2A:
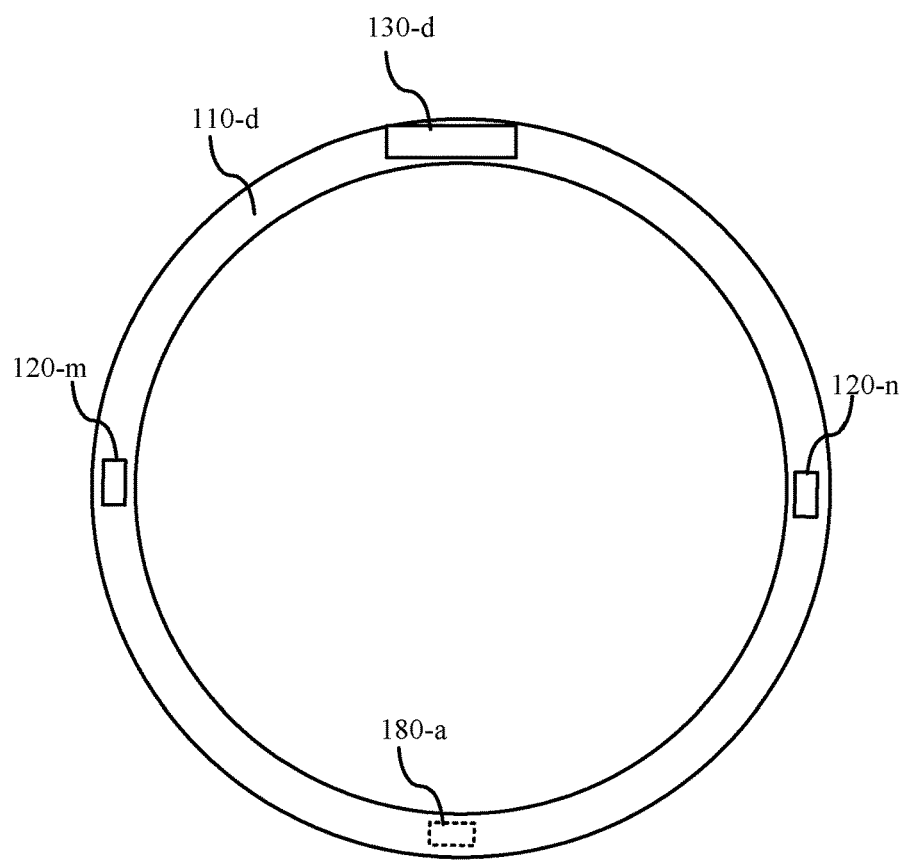
FIG. 2A, FIG. 2B, FIG. 2C, and FIG. 2D show animal wearable devices in accordance with various embodiments.

Turning now to FIG. 2A, an animal wearable device 100-*d* in accordance with various embodiments. Device 100-*d* may be an example of device 100 of FIG. 1A, for example. Device 100-*d* may reflect aspects of device 100-*a* of FIG. 1B, device 100-*b* of FIG. 1C, and/or device 100-*c* of FIG. 1D.

Device 100-*d* may include a collar 110-*d*, a computerized controller 130-*d*, and multiple stimulation components 120-*m*/120-*n*. The stimulation components 120-*m*/120-*n* be configured in different configurations on the collar 110-*d*. In some embodiments, the stimulation components 120-*m*/120-*n* include vibration components, e.g., vibration motors, that may use haptic feedback to control, protect, and/or train the animal, for example. In some embodiments, the haptic feedback may be used for controlling, protecting, and/or training purposes, as discussed in more detail below. Different vibration patterns, for example, may provide different cues to the animal. Different vibration patterns may provide more than a typical negative signal (e.g., a shock) to an animal. For example, the use of multiple vibration motors may be utilized to provide positive reinforcement, direction information, and/or other commands to an animal.

Some embodiments of device 100-$d$ may include a speaker 180-$a$. Speaker 180-$a$ may provide sound cues to the animal, such as an audio command to return, in conjunction with stimulation from the stimulation components 120-$m$/120-$n$, such as providing guidance on direction for the animal.

In some embodiments, the stimulation components 120-$m$/120-$n$ may make contact with the skin or other parts of an animal to ensure the haptic signal may be delivered based on an adaptive approach. For example, multiple haptic signal coding methods may be used to transmit information to the animal. These techniques may allow the system to apply signals via haptic feedback adaptively. Some embodiments may use haptic feedback motors 120-$m$/120-$n$ that may be independently controlled. For example, some embodiments may utilize two to six haptic feedback motors or other stimulation components 120. FIG. 2A shows an example of two simulation components 120-$m$/120-$n$. The number of stimulation components may be increase, while sized decreased in some cases, such as through the use of electronically controlled fabrics (e.g., electro-active polymers or similar technology) such that the number of effective stimulation components increases indefinitely; this may create in effect a continuous surface of stimulation components that may be utilized to provide a wide variation in the ways that stimulation-based information is provided to an animal.

In some embodiments, two of the stimulation 120-$m$/120-$n$ are positioned on opposite sides of the collar 110-$d$ so as to be positioned on opposite sides of the animal's neck. As a result, directional cues can be given more easily to the animal by actuating the stimulation on the corresponding side. Other, more complicated control signals may also be given using the stimulation components 120-$m$/120-$n$. For example, individual vibration components 120-$m$/120-$n$ may be controlled to vary in amplitude and/or pattern as is typical of a linear resonant actuator or similar mechanical device. This may allow each individual vibration motor to signal the animal via amplitude modulation, pulse duration, and/or pulse occurrence (pulse frequency). When multiple vibration components 120-$m$/120-$n$ are included, such as in the depicted FIG. 2A, they may be coordinated and used in concert with each other to create more descriptive feedback to the animal. The individual patterns of each vibration motor may work in a pattern with the other motors. For example, vibration motors 120-$m$/120-$n$ on either side of the animal wearable device 100-$d$ may be made to vibrate with a same intensity but with a pattern 180 degrees out-of-phase with each other to transmit a communication that the animal can learn to associate with the particular vibration pattern. More complicated direction cues may also be given to the animal using the vibration motors 120-$m$/120-$n$. For example, a behavior may be taught to the animal where the animal moves at a speed relative to the amplitude of the vibration in a direction of the high frequency pattern. Other combinations may be implemented using one or more vibration motors using varying amplitude, frequency, pulse frequency, pulse duration, and/or pulse shape.

In some embodiments, stimulation components 120-$m$/120-$n$ may include electrical components to provide electrical stimulation instead of or in conjunction with vibration. Electrical feedback may be implemented in a similar manner to haptic feedback discussed above, e.g., using multiple contact points and varying amplitude, frequency, pulse frequency, pulse duration, and/or pulse shape.

In some embodiments, the animal wearable device 100-$d$ may be usable when the collar 110-$d$ is at any orientation with respect to the animal. In other embodiments, the collar 110-$d$ may be oriented at a single correct orientation. In some embodiments, the collar 110-$d$ may be affixed in a variety of ways and sensors on the animal wearable device 100-$d$ may be used to determine the orientation and location of the animal wearable device 100-$d$ on the animal.

In some embodiments, the animal wearable device 100-$d$ may include stimulation components 120-$m$/120-$n$ configured as force feedback components to communicate with the animal. The animal wearable device 100-$d$ through controller 130-$d$ may actuate these components 120-$m$/120-$n$ to constrict or otherwise vary a normal force applied to the animal. In some embodiments, the application of force by multiple independently controllable components 120-$m$/120-$n$ may be employed to encode messages that are used to transmit information to the animal. For example, the animal wearable device 100-$d$ may quickly constrict and un-constrict a force feedback device to mimic the tug of a leash on a choker-style collar. In some embodiments, pressure can be quickly increased on the lower part of the collar 110-$d$ while simultaneously decreased at the upper part of the collar to mimic the tug of a leash on a non-choker style collar. Similar embodiments may be used to mimic or the pull of reins on a bridle, both a traditional and gag bridle. Other embodiments may use the application of force, both additive and reductive, to communicate signals to the animal. The forces may be applied and controlled using a variety of methods, e.g., electrical, mechanical, pneumatic, magnetic, thermal, hydraulic, or inflatable actuators. In some embodiments, the direction of a pulling or pushing force can be communicated by the magnitude and relative application of the forces.

Some embodiments may utilize electrical solenoids that actuate a spring-loaded mass for specific stimulation components 120-$m$/120-$n$. The solenoids generally actuate radially outward from the center of the collar 110-$d$. The solenoid power may act against the force of the spring. Once full stroke is reached, the mass may return to the previous unactuated state by the potential energy in the spring. In the example of device 100-$d$, two solenoids as stimulation components 120$m$/120$n$ (located left and right on the collar 110-$d$ as viewed from the rear side of the animal) may steer the animal by coordinating solenoid impulses. Activation of a solenoid may provide a directional input as a bridle would on a horse. The magnitude of the impulse felt by the animal after the solenoid reaches its full stroke may be controlled by the current sourced into the solenoid. A greater current may accelerate the solenoid to a greater speed prior to reaching full stroke and abruptly stopping, causing the impulse felt by the animal. These solenoid pulses may be varied in frequency as well as magnitude by the controller 130-$d$ controlling all sensors and actuators on the collar 110-$d$.

Figure 2B:
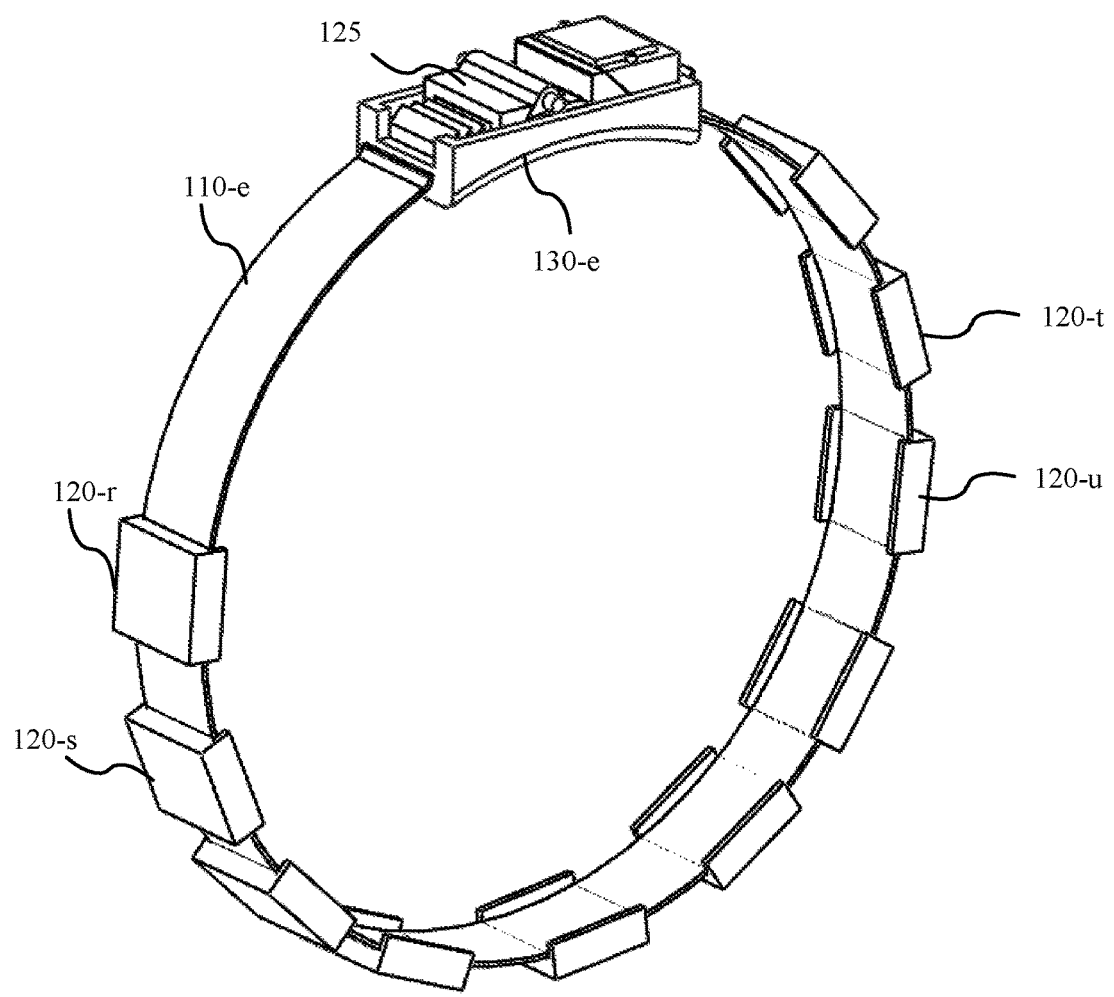

FIG. 2B shows an example of an animal wearable device 100-$e$ in accordance with various embodiments. Device 100-$e$ may be an example of aspects of device 100 of FIG. 1A and/or device 100-$d$ of FIG. 2A, for example. In particular, device 100-$e$ may include more stimulation components than shown in FIG. 2A. Device 100-$e$ may also reflect aspects of device 100-$a$ of FIG. 1B, device 100-$b$ of FIG. 1C, and/or device 100-$c$ of FIG. 1D.

Device 100-$e$ may include a securing apparatus 110-$e$ along with a closing component 125 that may be utilized to securing portions of the securing apparatus 110-$e$ together.

Device 100-e may also include a computerized controller 130-e located as part of the closing component 125; in other embodiments, the computerized controller 130-e may be located elsewhere on the securing apparatus 110-e. Device 100-e may include multiple stimulation components; for example, device 100 may show ten stimulation components, with four specifically called out as 120-r/120-s/120-t/120-u. These stimulation components 120-r/120-s/120-t/120-u may provide multiple vibration and/or force components. In some embodiments, the stimulation components may also include lights and/or speakers.

Figure 2D:
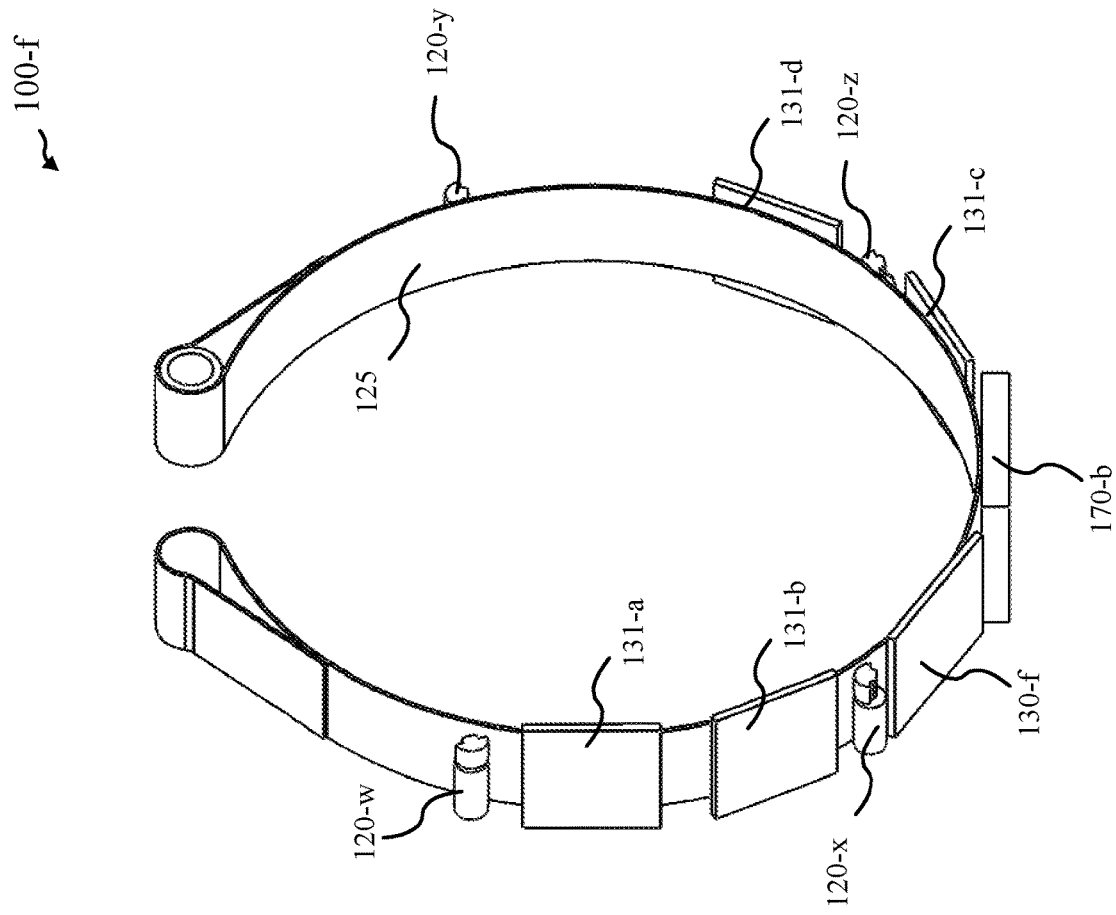
Figure 2C:
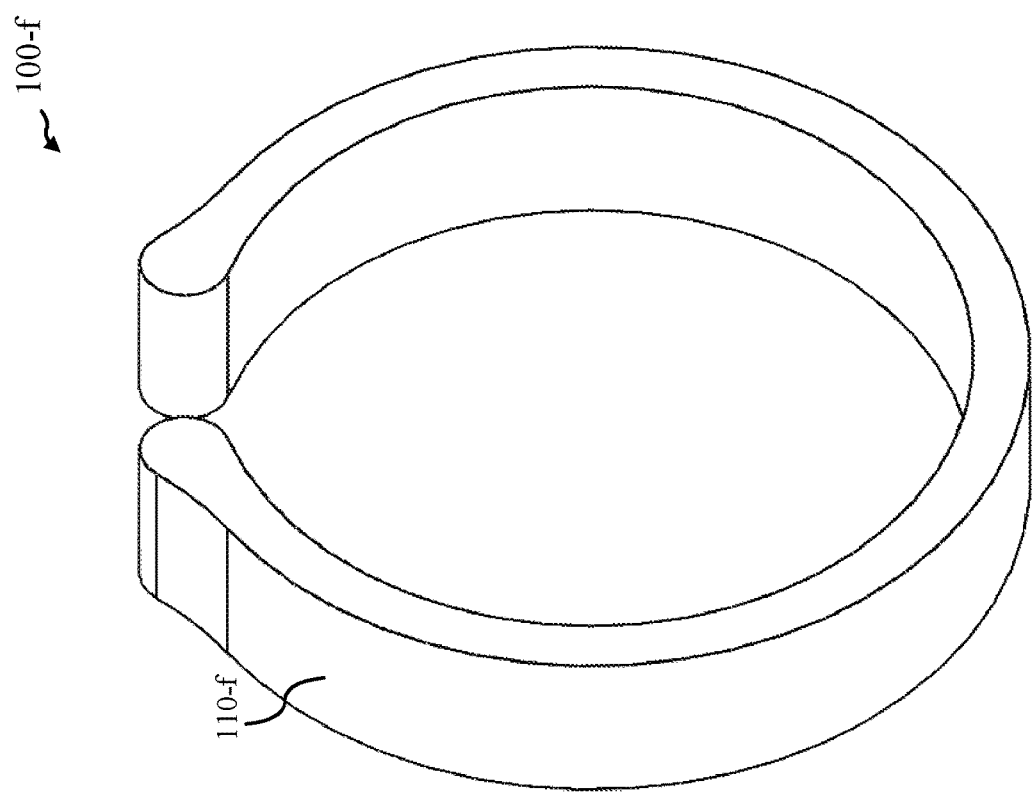

FIG. 2C and FIG. 2D show aspects of an animal wearable device 100-f in accordance with various embodiments. Device 100-r may be an example of device 100 of FIG. 1A; device 100-f may reflect aspects of device 100-a of FIG. 1B, device 100-b of FIG. 1C, device 100-c of FIG. 1D, device 100-d of FIG. 2A, and/or device 100-e of FIG. 2B. FIG. 2C may show the exterior view of a securing apparatus 110-f of device 100-f, while FIG. 2D may show other components of device 100-f that may be enclosed within the securing apparatus 110-f. For example, FIG. 2D shows a portion of the securing apparatus that may include a stiffening component 125; in some embodiments, the stiffening component 125 may include spring steel or other materials that help keep the form of the securing apparatus 110-f. Device 100-f may include multiple stimulation components; in this example, four stimulation components 120-w/120-x/120-y/120-z are shown; typically, these stimulation components may include vibration and/or force components, though other stimulation components may be utilized (speakers, lights, etc.). Device 100-f may also include one or more batteries 170-b that may provide power for the electronic components of device 100-f. Device 100-f may include a computerized controller 130-f. Additional electronic components and/or circuitry may include in portions of the collar, such as 131-a/131-b/131-c/131-d. These additional components may include items such as printed circuit boards, motion components, location components, status components, sensors (e.g., microphones, cameras), and/or additional stimulation components (e.g., lights, speakers, displays, projectors).

In some embodiments, the four stimulation components 120-w/120-x/120-y/120-z may utilize one specific type of stimulation component such as vibration components, force components, speaker components, and/or light components. Some embodiments may be configured such there are a variety of stimulation components utilized. For example, stimulation components 120-w and 120-y may be formed from vibration components, while stimulation component 120-x may be a speaker component and stimulation component 120-z may be a light component. Other combinations may be utilized in accordance with various embodiments; merely by way of example, stimulation components 120-w and 120-y may be formed from speaker components and stimulation components 120-x and 120-z may be formed from force components. Some embodiments may also utilize one or more microphone (not shown in this embodiment). In some embodiments, device 100-f may include one or more connectors (e.g., straps, buckles, not shown) to connect the left and right portion of the device 100-g; this may help further secure the device 100-f to an animal; an example of a similar connect may be shown in FIG. 2B.

Figure 2E:
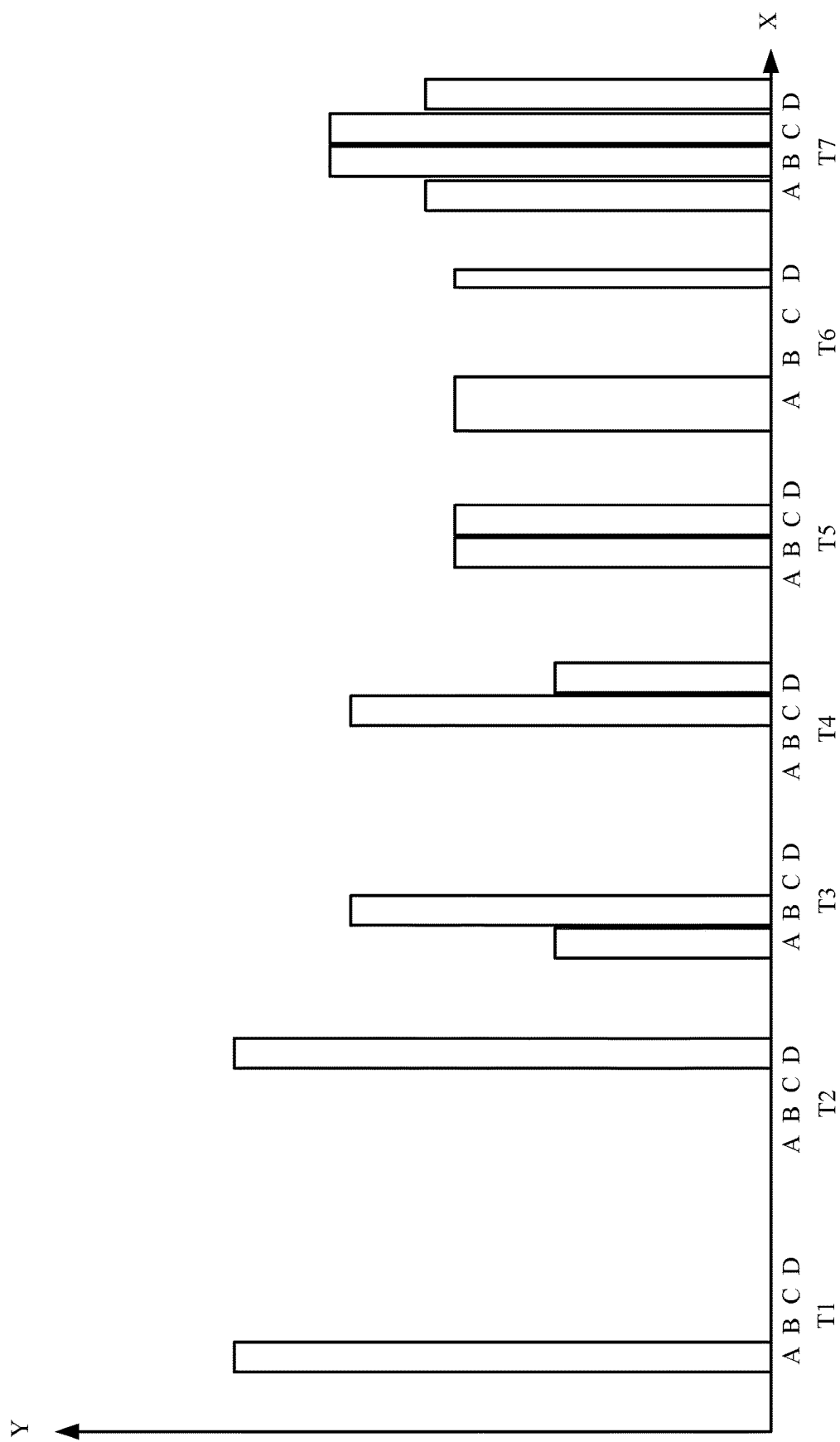
FIG. 2E and FIG. 2F show stimulation component activation graphs in accordance with various embodiments.
Figure 2F:
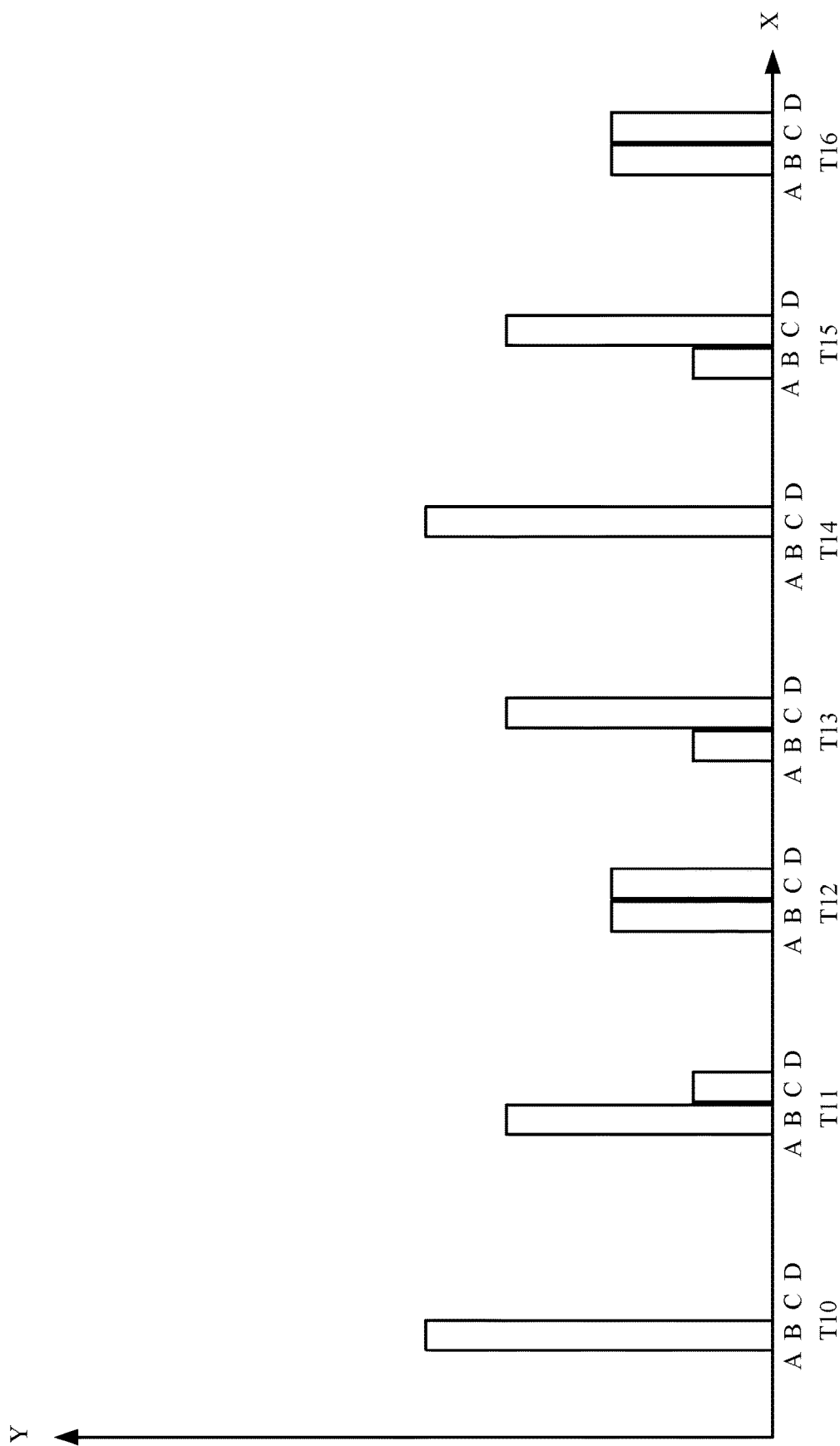

Turning now to FIG. 2E and FIG. 2F, different examples of the use of multiple stimulation components (such as those shown in FIG. 1A, FIG. 1B, FIG. 1C, FIG. 1D, FIG. 2A, FIG. 2B, FIG. 2C, and/or FIG. 2D) for a variety of purposes are provided in accordance with various embodiments. For example, the stimulation component(s) 120 may provide signals based on at least amplitude modulation, pulse duration, or pulse occurrence. In some embodiments, multiple stimulation components 120 are coordinated with each other so as to provide a pattern. For example, the pattern may include vibrating out-of-phase at least two vibration components from the multiple simulation components on opposite sides of an animal. Other patterns may also be utilized through the use of one or more stimulation components 120 in a variety of combinations with a variety of signal values.

FIG. 2E, for example, shows a stimulation component activation graph 201 in accordance with various embodiments, where the X axis may represent time and the Y axis may represent activation value for stimulation components. Examples of activation value may include amplitude and/or frequency of vibration, force, light, and/or sound, for example. Merely by way of example, graph 201 may show four stimulation components, such as four vibration components, represented as A, B, C, and D (some embodiments may utilize fewer or more stimulation components); these components A,B, C, D may represent stimulation components 120-w, 120-x, 120-z, and 120-y of FIG. 2D, respectively, for example. At time T1, vibration motor A may be activated to give directional cue to an animal to turn left. At time T2, vibration motor D may be activated to give directional cue to an animal to turn right.

Numerous variations on the use of vibration motors (or other stimulation components) through varying the number of stimulation components utilized along with varying the activation value of each stimulation component may be utilized in accordance with various embodiments. For example, a directional cue may be given at T3 with vibration motor A activated with a lower value than vibration motor B to direct the animal to go forward but slightly to the left. Similarly, a directional cue may be given at T4 with vibration motor D activated with a lower value than vibration motor C to direct the animal to go forward but slightly to the right. A general forward direction may be indicated through utilizing approximately equal stimulation provided by stimulation component B and C as may be shown at time T5. Other variations may be provided to provide a variety of directional cues.

Different combinations of one or more stimulation components may be utilized to provide for different commands beyond directional cueing, such as providing commands to alert an animal, to command an animal to return, to positively reward an animal, to indicate to an animal that they are acting in a way that is not desired, etc. With four stimulation components, for example, multiple combinations of one, two, three, or four stimulation components may be utilized (e.g., there may be 15 different ways to chose different combinations of 1, 2, 3, or 4 stimulation components); combined with varying the activation value (such as amplitude, frequency, etc), the number of possible varied signals that may be conveyed to an animal becomes unlimited. Even with just two stimulation components, three different combinations at a set activation value may be achieved, which again may be dramatically increased through variations in activation value of the individual stimulation components.

Further variation in the application of the different activated stimulation components, such as varying duration (which may be represented at T6 through a wider bar (stimulation component A) or narrower bar (stimulation component D), may also be provided. At time T7, an example of all four stimulation components may be shown that may provide a variety of different commands to an animal; merely by way of example, this may reflect a signal that represents a tug on the collar straight back as the animal may sense the strongest signal in the two stimulation components B and C on each side of the center of the collar, with less stimulation felt on each side (stimulation components A and D).

FIG. 2F provides further examples through stimulation component activation graph 202. Graph 202 may show an example of the use of a pattern that may include vibrating (or otherwise stimulating) out-of-phase at least two stimulation components from the multiple simulation components on opposite sides of an animal (such as opposite sides of an animal's neck or torso). At T10, stimulation component B may be a first value, with the other stimulation components not being activated. Stimulation component C may then increase from zero as stimulation component B decreases successively from T11, to T12, to T13, and to T14, when stimulation component C may be at the first value. Times T15 and T16 show stimulation component C decreasing while stimulation component B increases. These changes over time may reflect these two stimulation components B and C being out of phase with each other (as the value of one stimulation component decreases, the other stimulation component may increase).

Figure 3:
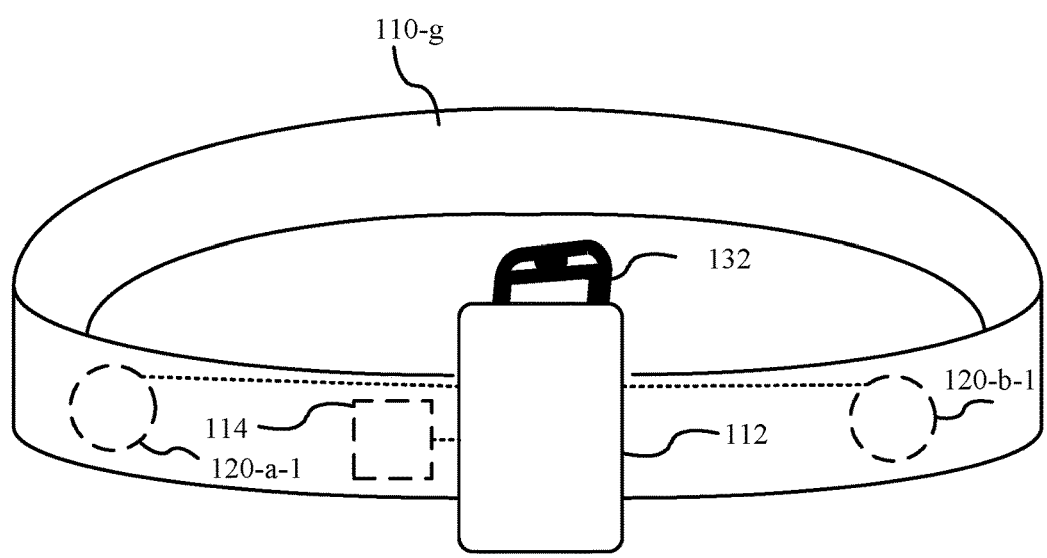
FIG. 3 shows an animal wearable device in accordance with various embodiments.

Turning now to FIG. 3, an animal wearable device 100-g in accordance with various embodiments is provided. Animal wearable device 100-g may include a securing apparatus 110-g, such as an animal collar. A user device holder 112 may be coupled with the securing apparatus 110-g; the user device holder 112 may be configured to hold a user device 132 such as a smart phone or cell phone, in general, which may provide numerous components, such as a computerized controller, stimulation components, location components, and/or motion components. Device 100-g may provide a variation on construction of the animal wearable devices described above where the aspects of the user device 132 may provide for the functions as described with respect to other animal wearable devices 100 described elsewhere. User device 132 may be inserted and held in user device holder 112 in general.

In effect, the smart phone 132 may provide for the functionality of a computerized controller as described herein along with other mobile device derived technology, including, but not limited to batteries, microprocessors, graphics processors, flash memory, cellular telephony, Wi-Fi, Bluetooth, Near Field Communication (NFC), Global Positioning System (GPS), accelerometers, gyroscopes, magnetometers, thermometers, lights, buttons, speakers, microphones, cameras, heart rate monitors, antennas, and ports including USB and other varieties. These components can be arranged and interconnected as in a typical smart phone device; some embodiments may utilize more simplistic user devices such as a cell phone. In addition, typical smart phone software can be used, where desired, in conjunction with these components.

By using conventional smart phone technology, many of the smart phone's features, such as those listed above, can be used to implement features of different embodiments. For example, communications between a user and an animal may be implemented using the smart phone's wireless communications ability.

In some embodiments, device 100-g may include additional stimulation components 120-a-1/120-b-1 coupled with securing apparatus 110-g. These stimulation components 120-a-1/120-b-1 may be coupled with the user device 132; some embodiments may utilize the stimulation components native to the user device 132 and/or in conjunction with the additional stimulation components 120-a-1/120-b-1.

Some embodiments of device 100-g may include a signal booster 114. For example, the transmitter and/or receiver range of the animal wearable device 100-g may be improved by increasing transmitting power and/or receiver gain beyond what may be typical for user device 132, human wearable devices, and/or user peripherals. In some embodiment, one or more signal boosters 114 may be coupled the user device 132. For example, a signal booster 114 may be connected to the USB or audio port of the user device 132 to exchange information. This may be beneficial, e.g., when the animal wearable device 100-g may be used while hunting or in other rugged deployments in which it may be desired for the user device 132 to have protective shielding, extra battery power, and/or a radio transmitter that can be received by the collar (radio receiver specific to the carrier frequency). In some embodiments, signal booster 114 may be configured to provide additional power to the user device 132. In some embodiments, the signal booster 114 may provide additional transmission channels over which information may be exchanged.

Figure 4A:
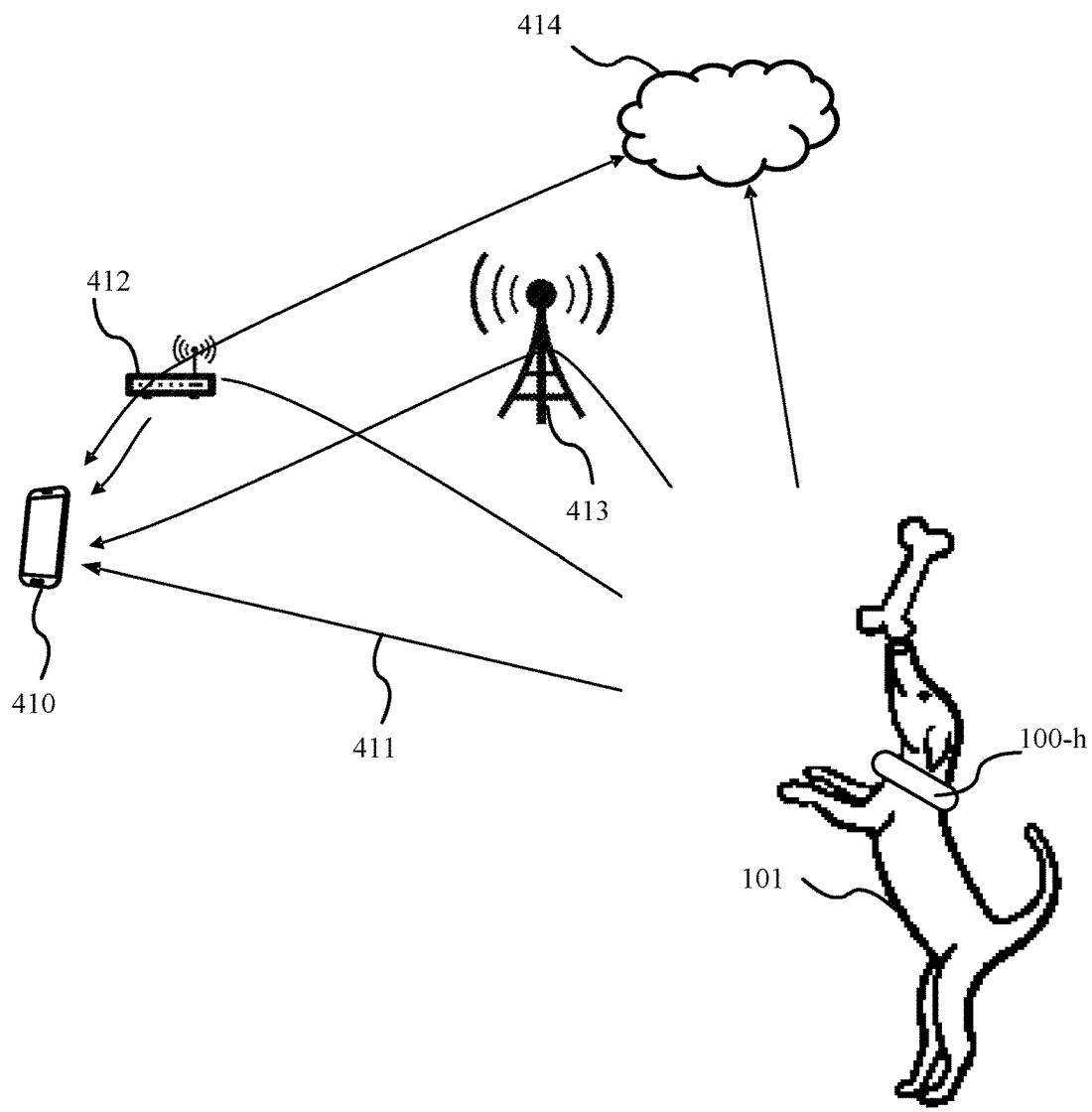
FIG. 4A and FIG. 4B show systems in accordance with various embodiments.

Turning now to FIG. 4A, a system 400 is shown in accordance with various embodiments. System 400 may different paths of communication between an animal wearable device 100-h and a user device 410, such as a smart phone. Device 100-h may be an example of animal wearable devices 100 of FIG. 1A, FIG. 1B, FIG. 1C, FIG. 1D, FIG. 2A, FIG. 2C, FIG. 2D, and/or FIG. 3. The animal wearable device 100-h may exchange data wirelessly with user device 410. The data exchange may be accomplished directly, e.g., via electromagnetic signals 411 directly between user device 410 and device 100-h, including Bluetooth, NFC, and/or infrared, for example. The data exchange may also be accomplished indirectly, e.g., via an intermediary such as a Wi-Fi Router 412, cellular network 413, and intranets and/or the internet 414. The animal wearable device 100-h may exchange data directly through sound using speakers and microphone or via images, in some cases.

Some embodiments may utilize smart switching. For example, as an animal 101 moves between Wi-Fi and Bluetooth and back, the system 400 may optimize connectivity with the animal 101 and animal wearable device 100-h; data may be synchronized between device 100-h and user device 410 (e.g. stores inertial and GPS data on animal wearable device 100-h locally then communicates back with system once Bluetooth or Wi-Fi is established). Some embodiments may utilize Wi-Fi Direct, where a router may be integrated directly into the animal wearable device 100-h.

In some embodiments, user device 410 may provide information to animal wearable device 100-h that may be utilized to train, protect, or control animal 101, for example. User device 410 may collect data that it may receive from animal wearable device 100-h and further process it; this processed information may be used to provide further information back to the animal wearable device 100-h. In some embodiments, animal wearable device 100-h may collect data locally and process it; this processes information may be sent to user device 410 or may be used without being sent to user device 410.

Figure 4B:
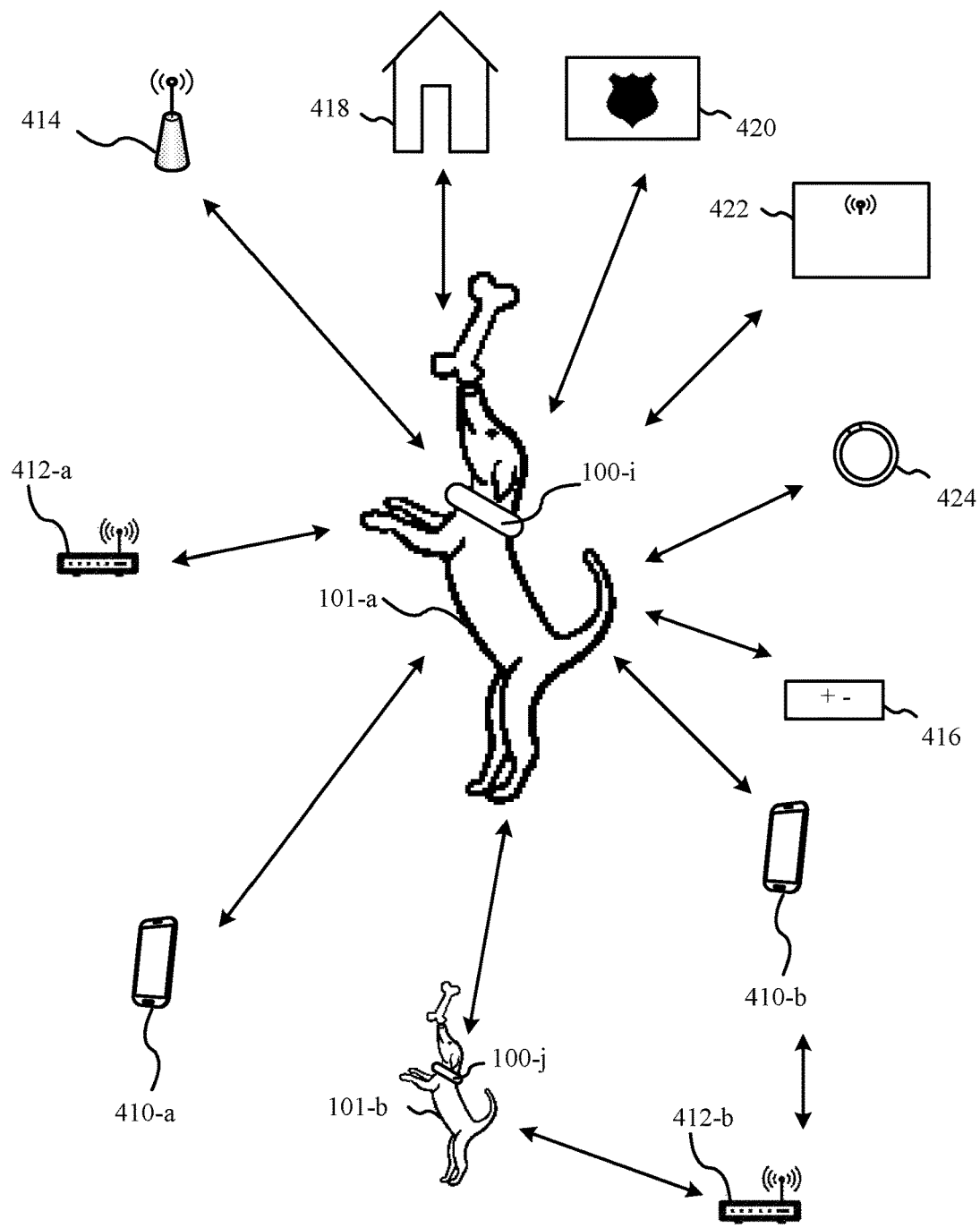

FIG. 4B shows another system 400-a in accordance with various embodiments. System 400-a may include aspects of system 400. An animal 101-a may wear animal wearable device 100-i and may connect directly or indirectly with different components of system 400-a. System 400-a may include a Wi-Fi router 412-a, another similar animal wearable device 100-*j* (which may be worn by another animal 101-*b*), a navigation device 414 (e.g., infrared or other sensors), a charging device 416, a human wearable device 424, another mobile user device 410-*b*, a home automation device 418, a home security device 420, and/or an automated training device 422. In some embodiments, the system 400-*a* may be considered to be a system of systems; various smaller systems can be incorporated to provide new and unique functionality for controlling, protecting, and/or training animals. These various systems may communicate with each other to accomplish the system-level functionality.

System 400-*a* may show another user device 410-*b* that may communicate with animal wearable device 100-*i* when a user device 410-*a* may not be able to communicate with animal wearable device 100-*i*. Similarly, the other animal wearable device 100-*j* may communicate with animal wearable device 100-*i* in different situations. The other animal wearable device 100-*j* and the other user device 410-*b* may communicate via another Wi-Fi router 412-*b* or other wireless communication.

The ability of animal wearable device 100-*i* to communicate with a wide variety of other devices of system 400-*a* may allow the animal wearable device 100-*i* to selectively switch between communication between different devices based on circumstances. For example, when user device 410-*a* may be proximate to animal wearable device 100-*i*, they may directly communicate over Bluetooth, NFC, or infrared. When user device 410-*a* may be further from animal wearable device 100-*i*, they may communicate through other devices such as a cellular network, Wi-Fi, and/or another user device 410-*b* and/or another animal wearable device 100-*j*. Animal wearable device 100-*i* may also directly interact with other devices of system 400-*a* that may not involve a user device 410-*a*, such as the interaction with charging device 416, home automation device 418, home security device 420, and/or automated training device 422, which may be described in more detail below.

In some embodiments, the animal wearable device 100-*i* may determine a location of the animal 101-*a*. This may be accomplished in a variety of ways, such as by determining the location, orientation, speed, and/or acceleration of the animal in reference to the Earth and relative to known references. Other methods may include the use of GPS, accelerometer, gyroscope, and/or communication signal ranging, including Wi-Fi, cellular, and/or Bluetooth. Navigation device 414 may be used in some embodiments.

The animal wearable devices 100 of FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, and/or FIG. 4B described above may be utilized for a wide variety of purposes, including, but not limited to, animal training, protection, and/or control. The following sections, in particular, discuss different methods that may be implemented utilizing one or more animal wearable devices 100 of FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, and/or FIG. 4B and/or related systems as described above.

For example, a variety of methods for training an animal may be achieved utilizing an animal wearable device 100 in accordance with various embodiments. In some embodiments, the computerized controller 130 of an animal wearable device 100 may be used to train the animal to respond to commands given in the various forms of stimulation (e.g., haptic feedback, electrical stimulation, audio commands, visual light or images, or any combination thereof) from the stimulation components 120 of an animal wearable device 100. In some embodiments, the computerized controller 130 converts a user's received commands (such as from a user device 410) to corresponding haptic feedback signals and then may present the audio commands (via one or more speakers such speakers 180) as and the haptic feedback signals to the animal via speaker and vibration motors. This may allow a human to train an animal using sounds generated by the human while also teaching the animal to associate the haptic feedback signals to those sounds. In some embodiments, the human voice signals may be recorded and/or stored on the animal wearable device 100. Merely by way of example, see method 700 of FIG. 7A and/or method 700-*b* of FIG. 7C.

Figure 6A:
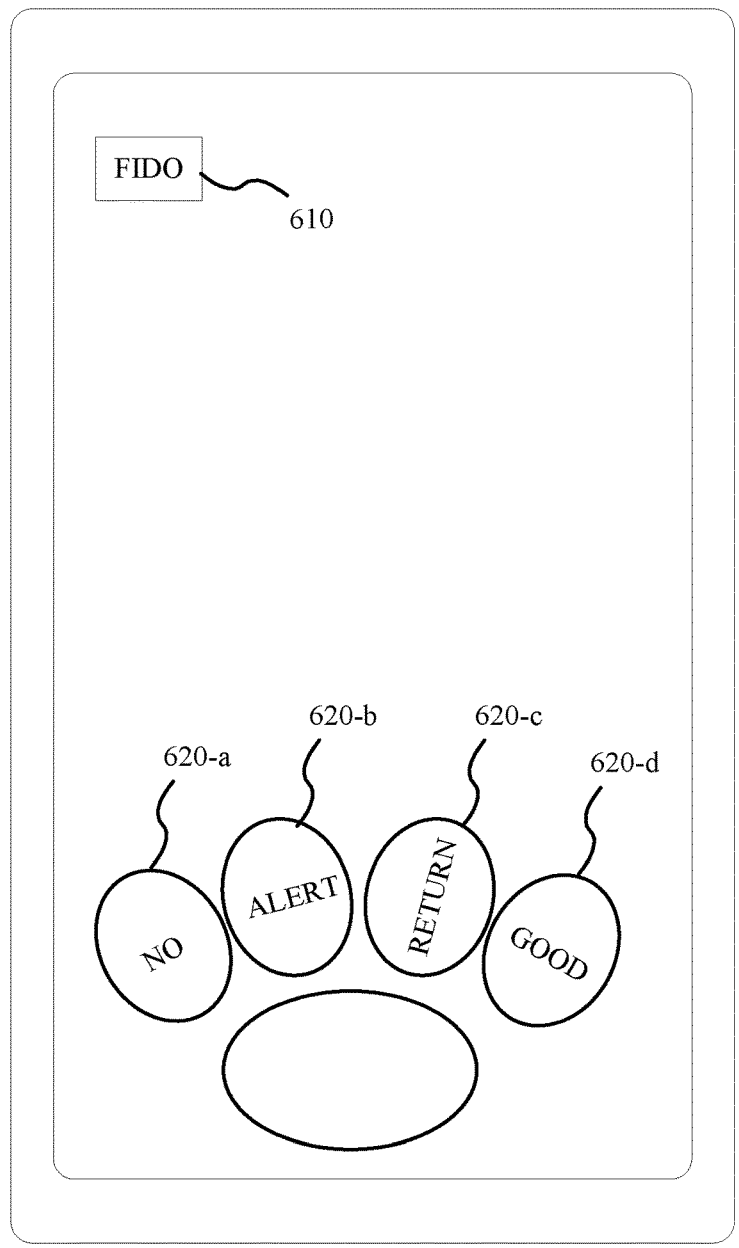
FIG. 6A shows a user device configured in accordance with various embodiments.

Some embodiments may utilize a user device 410, such as a smart phone, such that the human can train the animal to respond to the commands delivered by the animal wearable device 100. Merely by way of example, see method 700 of FIG. 7A, method 700-*b* of FIG. 7C, and/or method 700-*c* of FIG. 7D. FIG. 6A, described in more detail below, shows an example of a user device 410-*c* configured with respect to different training commands that may be transmitted from the user device to the animal wearable device 100 (FIG. 4A shows different paths through which the information may be communicated). For domestic house animals such as cats and dogs, for example, commands may include good/positive, no/negative, alert/pay attention, return, return to location/go home in addition to other human/trainer desired commands. In some embodiments, the user device 410 may provide directions to the human on how to train the animal. Merely by way of example, see method 700 of FIG. 7A and/or method 700-*e* of FIG. 7F.

Actively training an animal to respond to commands issued by the animal wearable device 100 may be referred to as basic animal training. Basic animal training may be accomplished by sending a trainer's audio commands directly to the animal wearable device 100 or by providing other stimulation to the animal using the stimulation components 120. Merely by way of example, see method 700 of FIG. 7A and/or method 700-*b* of FIG. 7C.

Some embodiments may utilize an automated training device 422, such as shown in FIG. 4B, which may be used as a supplement to human training, or it may replace human training interaction altogether. The automated training device 422 may communicate with a computerized controller 130 in similar ways that a user device 410 may communicate with the computerized controller 130. In some embodiments, the automated training device 422 may provide positive rewards in the form of food, scents, sound, or the like that is appropriate for the animal undergoing training. In some embodiments, the function of the automated training device 422 may be integrated into the computerized controller 130 of an animal wearable device 100.

Some embodiments may allow the user to automate training based on individual preferences. The user may set the animal wearable to redirect or reward the animal based on a wide range of parameters such as location, orientation, movement, sound, or biometrics, including the state of any of these variables over time. For example, the animal wearable device 100 may be set to reward with animal with a praise/reward signal when the animal has been detected resting in its bed in another room, while the user may be detected to be in the kitchen in hours indicted to be used for preparing meals. In some embodiments, the user may set the desired training behaviors by way of a series of menu selections. In some embodiments, the user may elect to record an example of behavior and direct the animal wearable to react to that behavior in a certain manner in future occurrences.

In some embodiments, the computerized controller 130 of an animal wearable device 100 may monitor the behavior of the animal. For example, the computerized controller 130 may monitor specifically how the animal responds to commands and/or stimulus utilizing other components of an animal wearable device 100 such as using sensors (e.g., microphone(s) 160, motion components 150, location components 140, and status components 175) on the securing apparatus 110. For example, when a particular command is given to the animal, the amount of time it may take for the animal to perform the command may be determined by the computerized controller 130. If an alert command is issued to the animal, the time it takes for the animal to cease making noise, to stop moving with respect to the earth, and/or to stop a local movement of its body may be measured. Merely by way of example, see method 700 of FIG. 7A and/or method 700-c of FIG. 7D. In some embodiments, the measured values may be compared to historical data corresponding to the particular animal, and/or reference data to determine if the animal may be in need of training. Merely by way of example, see method 700 of FIG. 7A and/or method 700-e of FIG. 7F. The comparisons can be performed by the computerized controller 130 or the animal's monitored data can be transmitted to an external device, such as a user device 410, so that the comparisons can be performed there. By way of example, the measured response time, measured time the intended behavior was performed, time between specific events, frequency of events, occurrence and duration of events with respect to time of day, age of the animal, location, and/or proximity to other known actors, such as the animal owner, and other variables may be used to score, monitor, and/or compare animal behavior. This data may be used to adjust procedures, frequency, and/or duration of training for any specific animal as implemented utilizing the computerized controller 130, for example. These capabilities also may allow a trainer to adapt training to each specific animal and situation The computerized controller 130 may measure and adapt training based on animal response. For example, when training an animal to return to a specific human, the animal wearable device 100 may keep track of prior commands given to the animal as well as the animal's relative position. As such, the computerized controller 130 may measure the time it takes for the animal to begin to respond to the return command, the path taking to return, and/or the speed at which the return is accomplished. The animal wearable device 100 may use directional cueing utilizing one or more of the stimulation components 120 to assist the animal in returning more efficiently, when presented with obstacles. For example, the animal wearable device 100 may train an animal to go over, instead of around, an obstacle.

An example of a use of the animal wearable device 100 may be to keep an animal in a bounded physical location. For example, a user may define a boundary for an animal, e.g., by using a graphical software based mapping application, or by surveying the boundary using a user device (such as user device 410), the animal wearable device 100, or a combination of the two, or by any other boundary-defining method. Merely by way of example, see method 700 of FIG. 7A and/or method 700-f of FIG. 7G. This bounded location may be outdoors, indoors, or a combination of the two. Objects such as furniture, rugs, gardens, pools, and steps can also be surveyed and considered boundaries, if desired.

Once the boundaries have been determined, the animal wearable device 100 may control the animal to stay within the boundaries. Merely by way of example, see method 700 of FIG. 7A and/or method 700-g of FIG. 7H. The computerized controller 130 of the animal wearable device 100 may determine the animal's position, velocity, acceleration, and/or orientation (utilizing location component 140 and/or motion component 150, for example) with respect to surveyed or otherwise known features such as roads and trails. Using behavioral cues, the animal wearable device 100 may alert the animal as it approaches a boundary, and may provide feedback when a boundary is broken or when the animal exhibits positive behavior with respect to the boundary. For example, when a boundary may be broken, one or more stimulation components 120 may be utilized to redirect the animal back to within the boundary area. User preferences and/or animal dependent factors may determine the redirection approach. In some embodiments, for example, a neutral cue, like the pet's name, may be used to get the pet's attention with a speaker 180, then one or more stimulation components 120 may be utilized to redirect the animal. Boundaries may also be used in a similar manner, but to keep animals out of an area or away from an object, for example.

The relative measurement with respect to boundaries may be done with respect to multiple degrees of freedom to any boundary. For example, the animal wearable device 100 may measure an animal's relative position to a bounded object such as a table. The animal may be permitted to stand next to the table in any orientation, and to be under the table. If the animal accelerates upward while facing and being located next to the table, this event may be detected by the animal wearable device 100 as a boundary violation and the animal wearable device 100 may accordingly initiate behavioral cueing utilizing one or more stimulation components 120.

Boundaries may also be dependent on other variables, if desired. In some embodiments, the boundary might be dependent on a specific absolute time or time relative to another event. For example, an animal may only be allowed on a specific porch during a specific time of day or year. Boundaries may be dependent on a relative location of a human. For example, the computerized controller 130 of the animal wearable device 100 may be programmed to allow an animal in a room, e.g., a kitchen or garage, only when a particular human may be determined to be in the room. This can be accomplished by receiving the relative location of a user device, such as a user's smart phone 410 or another human wearable device 424.

In some embodiments, a boundary may be selected that moves relative to another entity. For example, the animal wearable device 100 may be used to keep the animal within a specified relative distance to a user device, such as a smart phone 410 or another human wearable device 416. The relative boundary may use multiple degrees of freedom data to cue the animal to maintain relative speed, acceleration, and/or orientation with a human. The relative boundary may be used in conjunction with other boundaries. For example, the animal wearable device 100 may detect the animal's movement relative to a human and a road such that the animal is cued to stay within a specific distance (e.g., 20 feet) of the human but stay away from the road (e.g., at least two feet away). The animal wearable device 100 may be programmed through computerized controller 130 to keep the animal within a certain distance (e.g., five feet) of the human if it detects the human is near or in the road.

Some embodiments may utilize a moving boundary that may be created in a similar manner to a stationary boundary. Using this technology, the animal wearable device 100 may be used as an automated animal walker. For example, a human can preliminarily take an animal on a walk. The human can save the path traveled and/or the timing of the walk to be used in the future as a moving boundary utilizing the computerized controller 130 of the animal wearable device 100. The animal wearable device 100 may use this information to subsequently take the animal on the same path, but without the human. For example, the one or more stimulation components 120 may be utilized to provide feedback to the animal such as directing the animal along the path and/or redirect the animal to the path if the animal veers off the path. Using a user device (e.g., smart phone 410, computer, human wearable device 424, etc.), a user may modify the moving boundary as the animal is on the walk in some embodiments. This may provide an example of virtual animal walker technology.

Using combinations of boundary data, behavioral cueing, and/or motion direction, an animal can be directed to follow a precise path in some embodiments. For example, using a user device (e.g., smart phone 410, human wearable device 424, a computer) a human can direct an animal to a location via a specific path and timing through sending directions from the user device to the animal wearable device 100. This can be done in concert with other boundary rules described above, for example. This may provide an example of a remote control animal application.

Another use of the animal wearable device 100 may be to monitor and to direct the animal where and/or when to or not to defecate and/or urinate. This may be accomplished with the use of similar sensors of the animal wearable device 100. For example, the animal wearable device 100 may determine if the animal is or is not about to defecate or urinate using sound received from a microphone component 160, visual information received from a camera 185, biometric feedback from the animal itself (e.g., status components 175), physical contact with the animal wearable device 100, and/or by electromagnetic communication. When the animal wearable device 100 detects the act to be occurring in a prohibited boundary, it may alert the animal to stop through the use of one or more stimulation component 120. In some embodiments, the animal may be provided redirecting feedback behavioral cues to the animal through one or more of the stimulation components 120, directing the animal to another location, and/or provide positive feedback when the animal complies.

The animal wearable devices 100 may allow communication with humans near the animal. For example, sound and visual displays can be used to commutate with humans that are not electronically connected to the animal wearable device 100. For example, one or more lights 165 can be placed on the animal wearable device 100; these may be considered examples of stimulation components 120 in some embodiments. These lights may turn off and on, change in intensity, change colors, or create patterns to provide messages. For example, the lights may blink to show the animal wearable device 100 is monitoring and providing behavioral feedback to the animal. The lights may turn green to indicate that the animal is safe to approach, or read to indicate to stay away. A screen or similar electronic display technology 185 as part of the animal wearable device 100 may also be used. The animal wearable device 100 may also provide sound to communicate with humans. For example, one or more speaker components (such as speakers 180) may be utilized to indicate with sound that the animal is being monitored and directed by the animal wearable device 100. Sound signals may also be utilized to indicate that animal is safe to approach, or that the animal needs space.

Another use of the animal wearable device 100 may be to detect humans and other animals near the device 100. This may be accomplished with the help of sensors on the animal wearable device 100. For example, sound can be received by one or more microphone components (such as microphone(s) 160), and/or visual information can be received by a camera 185 integrated with the animal wearable device 100. In some embodiments, biometric feedback (through status components 175 for example) received from the animal itself may be utilized to determine that a human or another animal is near the animal wearable device 100. In some embodiments, physical contact with the animal wearable device 100 may be determined by pressure sensors and electromagnetic communication can be received using magnetic sensors. For example, an animal wearable device 100 on an animal on an automated walk may detect the presence of a human walking a dog on a traditional leash by hearing the dog and human using sound recognition, seeing the dog and human using visual recognition, noticing the increase in heart rate, breathing, and/or motion of the animal on the automated walk, detecting touch pressure on the animal wearable device 100 from the other dog on the walk and/or the human, and/or detecting signals from the human's smart phone 410, human wearable device 424, or animal wearable device 100 on the other animal.

Another example of the use of animal wearable device 100 may be to detect a lost pet. For example, when a pet is outside a set geographic boundary, the animal wearable device 100 may send a communication to the owner via a user device 410 indicating that the animal is outside the geographic boundary. This may be done either automatically or when directed to do so by the owner. The communication may also indicate where the animal is located utilizing one or more different location components 140. As discussed above, the geographic boundary may be defined utilizing a user device 410 and/or animal wearable device 100; the boundary information may be stored utilizing the computerized controller 130 of the animal wearable device 100 and/or may be stored on the user device 410 itself.

If the animal wearable device 100, such as device 100-*i* of FIG. 4B, is unable to communicate using the typical pathways directly to its owner, and its owner's network via Bluetooth, Wi-Fi, or similar, the animal wearable device 100 may emit a Bluetooth or similar signal with identification and location information. This information, which may be considered a lost pet beacon message, can be received by another animal wearable device, such animal wearable device 100-*j* or another user device 410-*b* of FIG. 4B, hosting a lost pet application. When a lost pet message is received by the other animal wearable device 100-*j* or the other user device 410-*b*, it may be directed to the animal's owner and/or transmitted to a lost animal web service.

In some embodiments, lost pet beacon data may flow from the lost animal's animal wearable device 100, such as animal wearable device 100-*i*, via Bluetooth to another animal wearable device 100-*j*, then to the other animal's home's Wi-Fi router 412-*b*, or to its owner's smart phone 410-*b* via Bluetooth, then to the internet via the owner's device's data connection. The lost pet beacon information may then be stored in a web based service and may be accessed by the lost pet's registered owner, similar to other well-known finder applications. If the owner of the lost pet has reported the pet missing to the service, a message may be sent to the smart phone device 410-*b* of the person that received the beacon, alerting them that there is a lost pet near them, providing a description of the pet, and a prompting them to put an invisible leash on the pet if they are able to do so at that time. In some embodiments, a pet owner may allow his pet and device to receive the beacon signals before he can use the service to find their pet.

Another example of the use of animal wearable devices 100 may include the sharing of electronic information with home/building automation, monitoring, and/or control systems including security, HVAC, and other automation systems. These interfaces may be implemented via any of the communication pathways available to the animal wearable device 100 described herein including Bluetooth, NFC, infrared, or via an intermediary including a Wi-Fi Router, cellular network, and intranets and the internet (see, e.g., FIG. 4A and/or FIG. 4B). For example, an animal wearable device 100 may send a message via Wi-Fi Router 412 and local network to an electronically controlled door to unlock and open the door when the animal wearable device 100 determines that the animal is positioned in front of and facing the door. In some embodiments, the location of an animal in a building can be used to change HVAC settings and/or turn on or off devices. Other capabilities of the animal wearable device 100 may be employed to improve the security of the animal's access to a building.

In some embodiments, the animal wearable device 100 may be a node and interact with the internet of things in a general sense. Individual humans may categorize individual pets across the spectrum from a "thing" to humanized pet or companion. Pets and service animals may fall somewhere on the spectrum between children and things for many pet owner, based on the individual. The animal wearable device 100 may provide capabilities that more generally belong to a thing, such as using camera or microphone information from the wearable. The animal wearable device 100 may provide capabilities that are generally thought of for humans, such as communicating to an internet of things device, such as the animal wearable communicating to an internet of things water bowl that the animal is approaching and thirsty.

In some embodiments, a biometric password maybe used to provide security. For example, a password may be used that includes measured animal data. This may provide a high level of assurance that the animal wearable device 100 is being worn by a known animal. In addition, the biometric data may be selected to show that the animal is not under undue stress (e.g., stress from being abducted). For example, in some embodiments, to open for a particular animal, a specific door at a home may receive a particular code from the animal wearable device 100. The animal wearable device 100 may transmit the code to the door only if the animal wearable device 100 detects that the animal is near the door. Other factors may be measured and taken into consideration such as a heart rate that is in an acceptable range for the particular animal. In some embodiments, the animal wearable device 100 may be utilized to train an animal to perform particular act, for example, spinning in two circles and purring once, before being allowed to enter. These last factors may prevent an individual from removing an animal wearable device 100 from a pet and/or carrying an animal wearing an animal wearable device through a locked door to gain unauthorized access. In some embodiments, the biometric password may involve a two-factor authentication. In some embodiments, the pet owner or other human may be contacted via their smart phone or other connected electronic device and requested to permit the action, such as opening a door.

In some embodiments, the animal wearable device 100 may be integrated as a node in a security system 420. The animal wearable device 100 may transmit location, sound, and/or image information to any system. The security system may direct an animal to a particular location using the directional cueing utilizing one or more the stimulation components of the animal wearable device 100 and may give the animal specific commands to execute, such as to bark in a particular direction. The animal, using the sensors on the animal wearable device 100, may alert a security system to a potential threat in a particular location. For example, a dog may be integrated into a home security system via the Wi-Fi signals of its animal wearable device 100. During the night, an outdoor motion detector might register motion near the back door. The security system may send an alert command to wake the dog via the animal wearable device 100, directing the dog to the back door, and/or command the dog to observe. After several minutes, the dog may hear a noise at the front door and run to a nearby window. The dog may bark once at the window. Depending on the time of day and/or the location of the dog at the window, for example, the animal wearable device 100 may send a message to the security system 420, which may result in the front lights being illuminated and high quality video and audio to be captured at the front door. In general, these embodiments may involve some form of trigger within the security system allowing with directing an animal wearing an animal wearing device 100 to take some form of action.

Figure 5A:
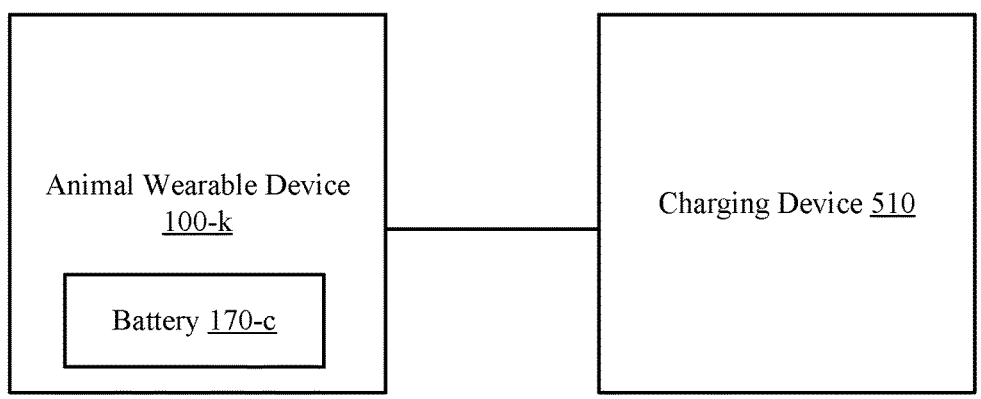

Turning now to FIG. 5A, a system in accordance with various embodiments is provided. System 500 may include an animal wearable device 100-$k$ and a charging device 510; charging device 510 may be an example of charging device 416 of FIG. 4B. Animal wearable device 100-$k$ may be an example of one or more of the animal wearable devices 100 of FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, and/or FIG. 4B. In general, the animal wearable devices 100-$k$ may include one or more batteries 170-$c$ to supply power to the electronic components of the device. The battery 170-$c$ may be charged, e.g., by direct connection, such as using a USB cable and/or contact pads, by induction, and/or by motion of the animal. In some embodiments, the battery 170-$c$ may be charged by exchanging battery 170-$c$ at charging device 510. In some embodiments, the battery 170-$c$ or batteries may be distributed to make the orientation of the animal wearable device 100-$k$ on the animal ideal for the electronic components when acting under the force of gravity. The animal wearable device 100-$k$, in some embodiment, has a permanent battery or similar power source, to provide power during the battery exchange or charging process.

Charging device 510 may be used to allow the animal to charge and/or exchange the battery 170-$c$ without regular human interaction. Using the charging device 510, a battery exchange method or battery charging method can be accomplished by having the animal move itself to a position where the battery 170-$c$ is in a relative position to the charging device 510. For example, in some embodiments, the animal wearable device 100-$k$ may send audio and/or haptic signals, or other signals from one or more stimulation components, to the animal when the animal wearable device 100-$k$ detects that the battery 170-$c$ may need charging and the animal may be near a suitable charging device. The animal may then respond by proceeding to the charging device 510. For example, the animal wearable device 100-$k$ may direct the animal to the charging device 510 using directional navigation cues. The charging device 510 may be mounted in a fixed location on a wall or rest on the floor or a pedestal in some embodiments. This may place the charging device 510 in a known orientation with respect to gravity. The charging device 510 and animal wearable device 100-*k* may communicate directly via any of the animal wearable device 100-*k* communication paths.

Numerous different methods may be used to aid the animal in placing the animal wearable device 100-*k* in a specific relative position to the charging device 510. For example, the position of the animal wearable device 100-*k* and charging device 510 may be determined using information from different navigation aids. For example, in some embodiments, wireless communication via Bluetooth and/or NFC ranging may be used to determine relative position when the animal is near the charging device 510. In some embodiments, signaling using infrared or other photonic signal with transmitters and receivers on the charging device 510 and animal wearable device 100-*k* may be used to provide precise relative position. Sound transmitted between the animal wearable device 100-*k* and the charging device 510 may alternatively be used to determine precise relative position. In some embodiments, magnetic fields created between magnets on the animal wearable device 100-*k* and charging device 510 may be used to determine precise relative position, as well as provide a physical force in guiding and/or holding the animal wearable device 100-*k* and charging device 510 in the correct position with respect to each other. If desired, a combination of two or more of these or similar methods can be used. The animal may be provided audio and/or haptic feedback, or other stimulation from one or more stimulation components, to guide the animal so as to place the animal wearable device 100-*k* in the correct relative position touching or near the charging device 510.

Figure 5B:
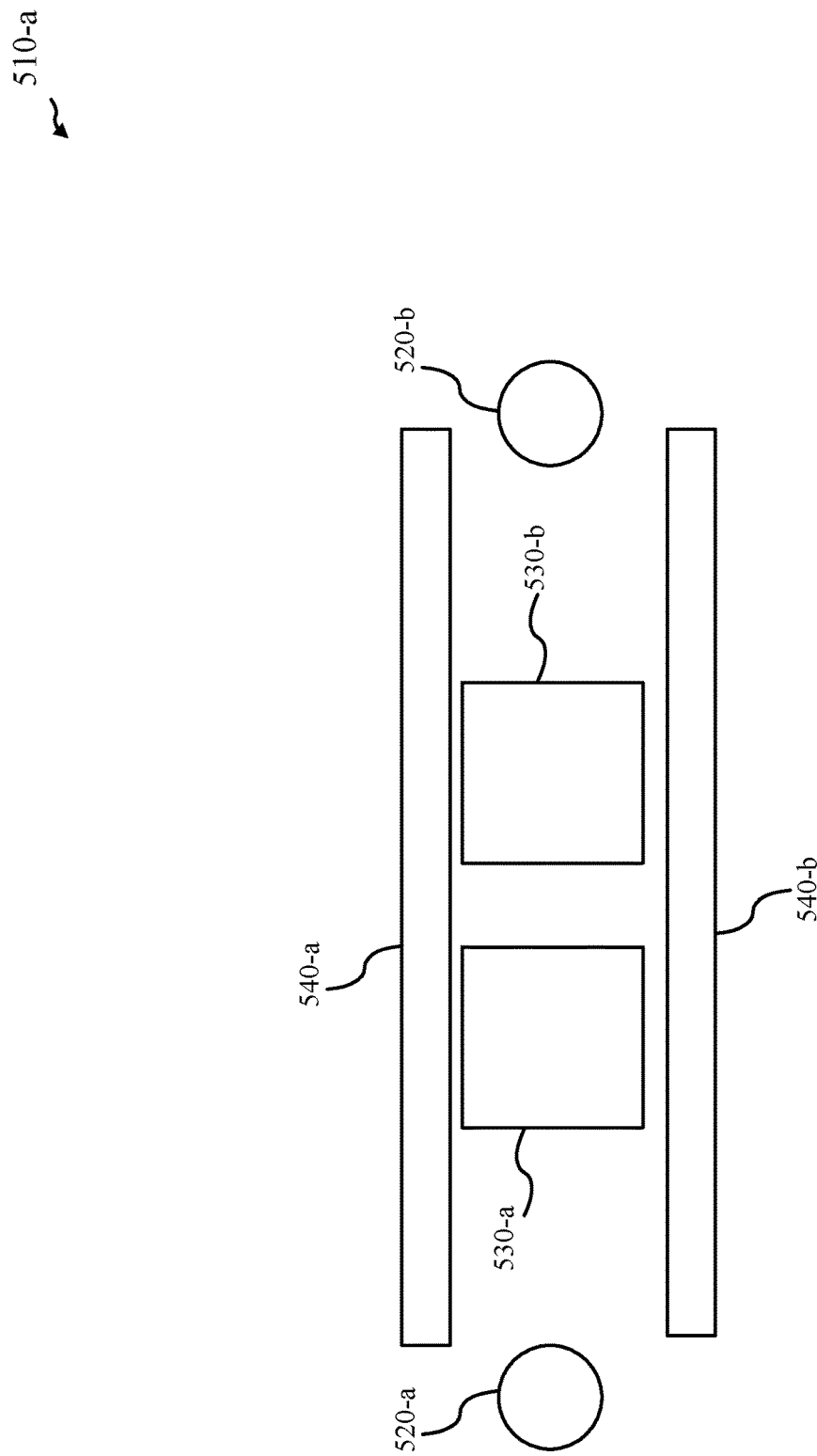

In some embodiments, a depleted battery may be swapped out for a new battery without human interaction. For example, when detected to be in the proper location for exchange, the animal wearable device 100-*k* may be held in place via magnetic or mechanical components. FIG. 5B, for example, shows a charging device 510-*a* that may have clamping bars 540-*a*/540-*b* that may move toward each other and hold the animal wearable device 100-*k* of FIG. 5A in place. The charging device 510-*a* may have one or more electromagnets 520-*a*/520-*b* that may hold the animal wearable device 100-*k* in place. The charging device 510-*a* may have one or more battery exchange terminals 530-*a*/530-*b*. One battery exchange terminal 530-*a* may clasp the depleted battery and remove it from contact with the animal wearable device 100-*k*. A second battery exchange terminal 530-*b* may then slide to the correct spot to place a newly charged battery onto the animal wearable device 100-*k*. Similarly, the animal wearable device 100-*k* may direct the animal to adjust the collar over a second battery exchange terminal 530-*b*.

In some embodiments, the animal wearable device 100-*k* may use different methods to hold the animal wearable device 100-*k* in a contact position for a period of time to allow the battery to be charged by charging device 510. In some embodiments, the charging device 510 may be part of an animal bed or similar furniture. In some embodiments, the battery can be charged by inductive charging when the animal wearable device 100-*k* is simply close to the charging device 510. Using this approach, the battery can be charged without removing it from the animal wearable device 100-*k*, while the animal sleeps at night, for example. In some embodiments, the charging device 510 may dispense rewards in the form of treats for animal behavior reinforcement at configurable instances.

Figure 5C:
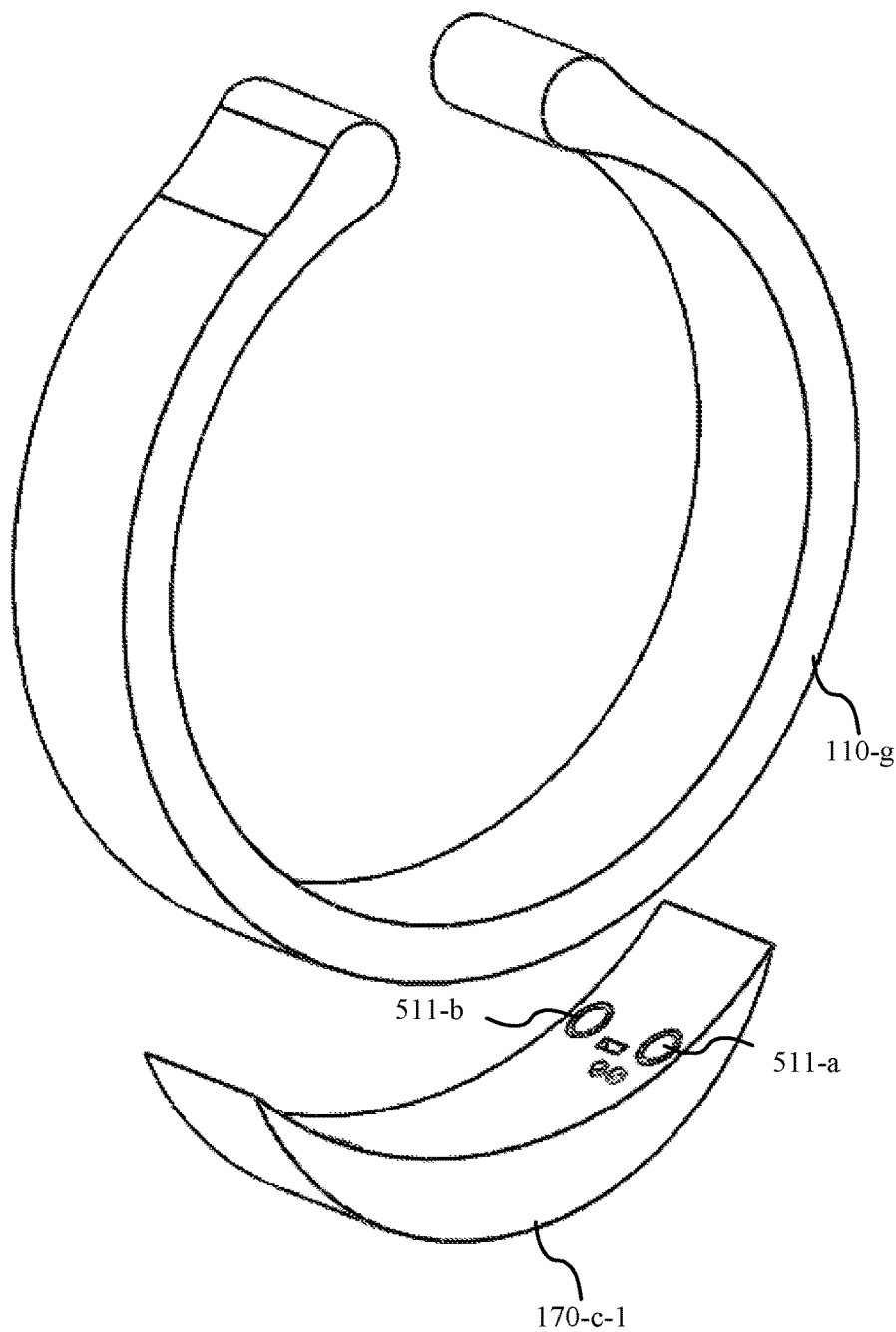

In some embodiments, the battery 170 is a rectangular slab with contact pads on either side (see, e.g., FIG. 5G); some embodiments may utilize batteries with other shapes, such as a curved battery configured to conform with a shape of the animal wearable device 100-*k* (see, e.g., FIG. 5C). One side of the battery may be arranged to mate with terminals/springs on the animal wearable device 100-*k* and the other side is arranged to mate with the charging device 510. The battery may include ferromagnetic material in each of the four corners. The battery may be held on the collar by electromagnetic force, and two electro-mechanical clasping rails. The mechanical clasping rails may hold the battery in place and may also cover contact pads on the outward side of the battery. When the battery is positioned near the mated side of the charging device, the electro-mechanical rails may be retracted and magnetic force alone supplied by electromagnets in the collar at the corners matching the locations of the ferromagnetic material in the battery. When the battery is positioned adjacent to the mated side of the charging device and after the rails have been retracted, electromagnets in the charging device may be turned on to attract the battery to contact the charging device. Shortly thereafter, the electromagnets in the collar may release, and the battery may be held by force in solely by the charging device. In some embodiments, electronic communication signals are sent between the animal wearable device 100-*k* and the charging device 510 to position the animal and coordinate the release of the battery. A battery may be transferred from the charging device 410 to the animal wearable device 100-*k* in the reverse of the process to transfer from animal wearable device 100-*k* and the charging device 510.

In some embodiments, the charging device 510 has a three-sided component that may rotate so that one side may be presented to the outside while the other two sides may be shielded and hidden inside the charging device 510. Two sides of the three-sided component may be identical, and may be implemented as described above to enable them to receive and transfer a battery. In some embodiments, the third side is a plain/decorative cover with no electronic components exposed.

In some embodiments, to exchange one battery for another, the three-sided component may rotate. Initially, the decorative/plain side may be exposed as it may be the default state when the charging device 510 may not actively be exchanging batteries. When an animal wearable device 100-*k* may be detected in proximity and an exchange may be initiated, the three-sided component may be rotated to present the empty charging terminal to the animal wearable device 100-*k*. After the battery is transferred from animal wearable device 100-*k* to charging device 510, the three-sided component may be rotated to present the side housing a charged battery, which may then be transferred to the animal wearable device 100-*k* in the reverse of the process as described above.

FIG. 5C shows an example of an animal wearable device 100-*k*-1 in accordance with various embodiments. Animal wearable device 100-*k*-1 may be an example of one or more of the animal wearable devices 100 of FIG. 1A, FIG. 1B, FIG. 1C, FIG. 1D, FIG. 2A, FIG. 2B, FIG. 2C, FIG. 2D, FIG. 3, FIG. 4A, FIG. 4B, FIG. 5A, and/or FIG. 5B. Device 100-*k*-1 may show in particular a securing apparatus 110-*g* and a battery 170-*c*-1. Battery 170-*c*-1 may show multiple contact pads 511-*a*/511-*b*, which may couple with contact pads of the securing apparatus 110-*g* to facilitate providing power to the device 100-*k*-1. In some embodiments, battery 170-*c*-1 may be configured to decouple from securing apparatus 110-*g*. In some embodiments, battery 170-*c*-1 may be permanently coupled with securing apparatus 110-*g*.

Turning now to FIG. 5D, FIG. 5E, and FIG. F, a system 500-*a*, shown in different states, in accordance with various embodiments, is provided. System 500-*a* may include a charging 510-*b*. System 500-*a* may also include an animal wearable device such as shown in FIG. 5C, with securing apparatus 110-*g* and battery 170-*c*-1. Charging device 510-*b* may include multiple contact pads 513-*a*/513-*b*, which may couple with contact pads of battery 170-*c*-1 (the contact pads of battery 170-*c*-1 that may make contact with contact pads 513-*a*/513-*b* of charging device 510-*b* may be obscured from view). In some embodiments, battery 170-*c*-1 may be configured to rotate and/or flip in order to make contact between contact pads 511-*a*/511-*b* of the battery 170-*c*-1 and the contact pads 513-*a*/513-*b* of charging device 510-*b*. The sequence of FIG. 5D, FIG. 5E, and FIG. 5F may show battery 170-*c*-1 decoupling from securing apparatus 110-*g* and then coupling with charging device 510-*b* so that the battery 170-*c*-1 may be charged. In some embodiments, magnets or other electromagnetic components may be utilized to couple the battery 170-*c*-1 with charging device 510-*b*. In some embodiments, mechanical forces may be utilized, such as the use of clamping bars and/or clasping rails as described above may be utilized; magnetic and/or electro-magnetic forces may also be utilized in combination with mechanical forces.

In some embodiments, battery 170-*c*-1 may not decouple from securing apparatus 110-*g* during charging. For example, an animal may be directed to the charging device 510-*b* utilizing directional cueing or other commands through the use of one or more stimulation components. The animal may then position itself so that the battery 170-*c*-1 may couple with the charging device 510-*b*. In some embodiments, the securing apparatus 110-*g* and the battery 170-*c*-1 may decouple during charging, or the animal may stay in place while the battery 170-*c*-1 is charged.

Figure 5G:
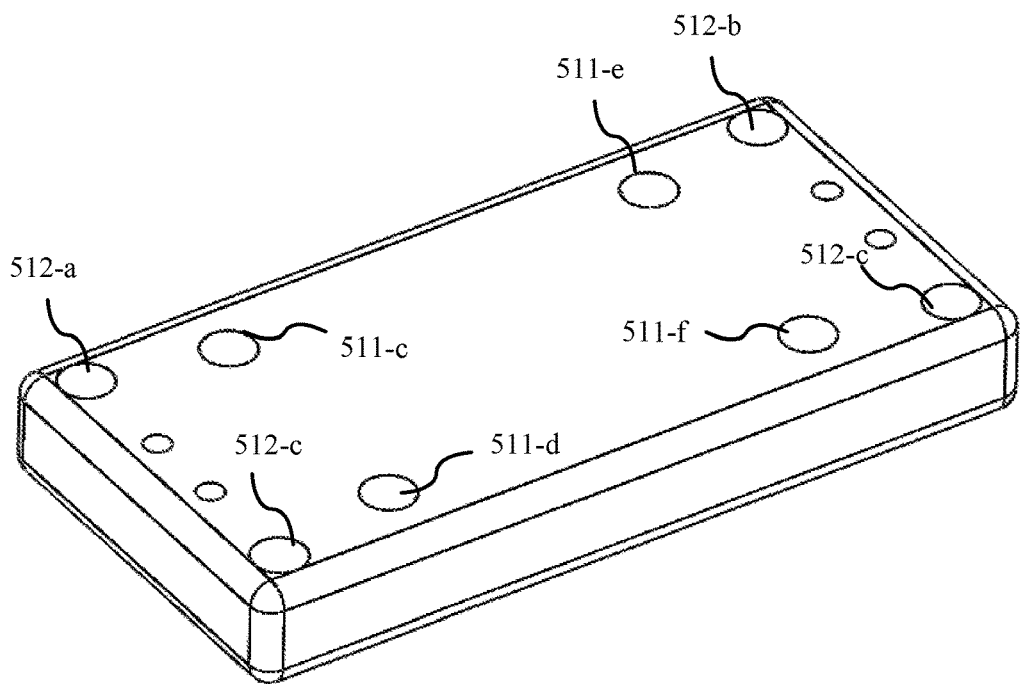

FIG. 5G shows another example of battery 170-*c*-2 in accordance with various embodiments. Battery 170-*c*-2 may show multiple contact pads 511-*c*/511-*d*/511-*e*/511-*f*, which may couple with contact pads on the animal wearable device 100-*k* to facilitate providing power to the device 100-*k*. Battery 170-*c*-2 may also include magnets 512-*a*/512-*b*/512-*c*/512-*d*, which may be positioned at the corners of device 510-*c* to facilitate positioning of the battery 170-*c*-2 with respect to the animal wearable device or with respect to a charging device during charging. Charging device with a general rectangular shape may be designed to conform to the shape of battery 170-*c*-2.

Turning now to FIG. 6A, a user device 410-*c* in accordance with various embodiments is provided. User device 410-*c* may be configured through software applications and/or hardware such that commands may be sent to an animal wearable device 100 and/or to receive information from an animal wearable device 100. In particular, user device 410-*c* shows a user interface that may include animal status icon 610, which may reflect one or more animals that the user device 410-*c* has set up a relationship with. Status icon 610 may also provide information regarding whether the user device is in current communication with an animal wearable device 100 being worn by a specific animal, such as "Fido".

User device 410-*c* may also have a variety of touch icons 620 as part of a user interface through which a user may train or otherwise communication with an animal wearable device 100. For example, touch icons 620 may be utilized to send commands to the animal wearable device 100 to teach the animal to respond to those commands. For domestic house animals such as cats and dogs, for example, commands can include good/positive icon 620-*d*, no/negative icon 620-*a*, alert/pay attention icon 620-*b*, and/or return 620-*c* (which may include return to location/go home) in addition to other human/trainer desired commands. In some embodiments, the user interface may provide directions to the human on how to train the animal.

Figure 6B:
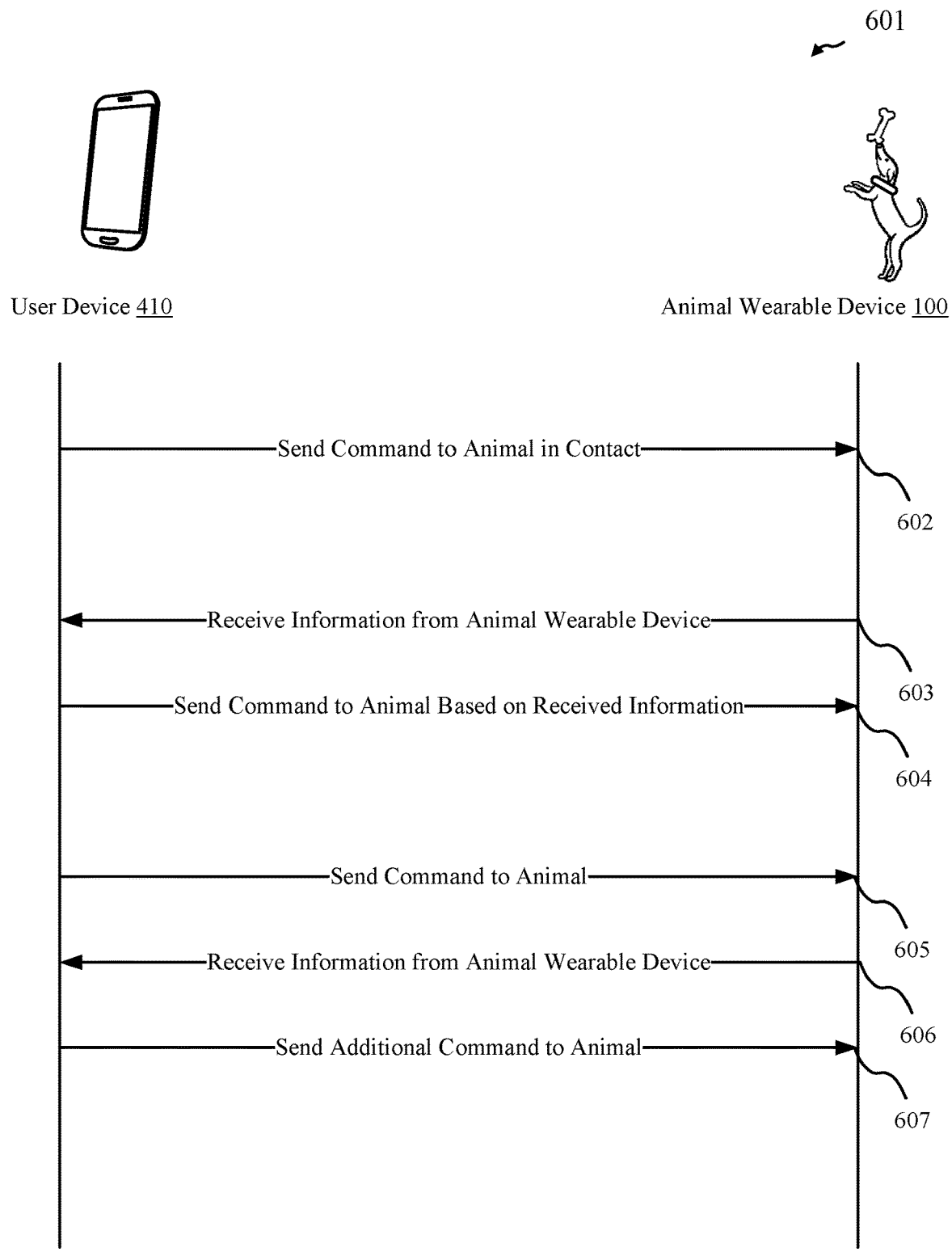
FIG. 6B shows a communication diagram in accordance with various embodiments.

FIG. 6B shows a communication diagram 601 that may be transmitted from a user device 410 (such as user device 410-*c*) and an animal wearable device 100 in accordance with various embodiments. These patterns of communication show some of the variety of communication that may be achieved in accordance with various devices and/or systems. Other communication may also be implemented as discussed herein.

For example, at communication point 602, a user may send a command from the user device to an animal via the animal wearable device; the command may be transmitted at the user device into a variety of signals to the animal, such as the use of one or more stimulation components as discussed herein. This may be a situation where a user may direct observe the animal and/or its surrounds. Commands may include, but are not limited to, those described with respect to FIG. 6A, such as good/positive icon 620-*d*, no/negative icon 620-*a*, alert/pay attention icon 620-*b*, and/or return 620-*c*.

At communication point 603, a user may receive information transmitted from the animal user device. This information may reflect the condition of the animal and/or some surrounding condition of the animal. The user may then transmit at communication point 604 one or more commands to the animal wearable device based on the information received. This may reflect a situation where the user may not be able to direct observe the animal or its surrounds and may rely on information that be determined by the animal wearable device.

In another example, at communication point, 605, a user may send a command from the user device to an animal via the animal wearable device; the command may be transmitted at the user device into a variety of signals to the animal, such as the use of one or more stimulation components as discussed herein. At communication point 606, information may be transmitted back to user device from animal wearable device based on information determined by the animal wearable device; for example, this may include information regarding how the animal may have responded to the command. At communication point 607, additional commands may be sent to the animal based on the information that the user has previous received.

These different communication scenarios may reflect some of the different ways that a user may train, protect, control, and/or other interact with an animal utilizing a user device and an animal wearable device.

Figure 7A:
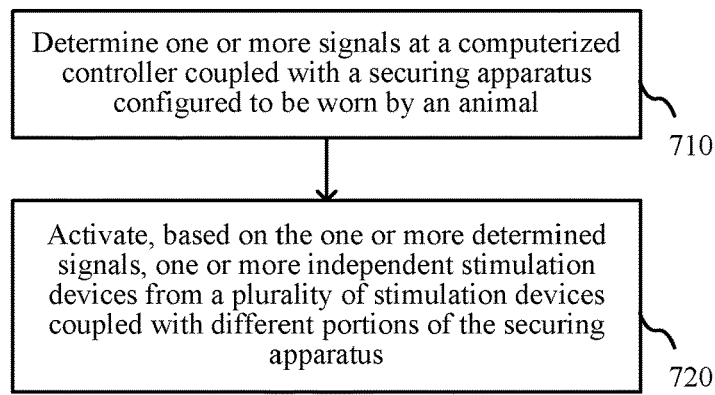
FIG. 7A shows a flow diagram of a method in accordance with various embodiments.

Turning now to FIG. 7A, a flow diagram of a method 700 is shown in accordance with various embodiments. Method 700 may be implemented utilizing a variety of systems and/or devices such as those shown and/or described with respect to FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, FIG. 4B, FIG. 5A, FIG. 5B, FIG. 5C, FIG. 5D, FIG. 5E, FIG. 5F, FIG. 5G, FIG. 6A, and/or FIG. 6B.

At block 710, one or more signals may be determined at a computerized controller coupled with a securing apparatus configured to be worn by an animal. At block 720, one or more stimulation components from multiple stimulation components coupled with different portions of the securing apparatus may be activated based on the one or more determined signals. The multiple stimulation components may include multiple vibration and/or force components, for example. Other stimulation components may be utilized in some embodiments.

In some embodiments of method 700, activating the one or more stimulation components provides directional cues. In some embodiments, activating the one or more stimulation components include activating the one or more stimulation components in a pattern.

In some embodiments of method 700, determining one or more signals includes determining multiple sound signals. Some embodiments include determining at least a distance or a direction to a sound source based on the determined multiple sound signals. Some embodiments of method 700 include receiving the one or more signals from a user device.

Some embodiments of method 700 include: determining one or more boundary conditions; determining whether the one or more boundary conditions are satisfied utilizing the one or more determined signals; and/or utilizing whether the one or more boundary conditions are satisfied to activate the one or more simulation components. In some embodiments, the one or more boundary conditions include one or more physical locations. In some embodiments, the one or more boundary conditions include one or more time conditions. In some embodiments, the one or more boundary conditions change over time. In some embodiments, the one or more determined signals include at least a position, velocity, acceleration, or orientation of the secured device with respect to the one or more boundary conditions.

In some embodiments of method 700, the multiple stimulation components include multiple light components. The multiple light components may be configured to project at least a light pattern or an image in a field of view of an animal wearing the securing apparatus. In some embodiments, the multiple stimulation components include multiple sound components.

In some embodiments of method 700, activating the one or more stimulation components directs the animal to a charging device. Some embodiments include charging one or more batteries coupled with the computerized controller while holding the securing device with respect to the charging device. Some embodiments include exchanging one or more batteries coupled with the computerized controller while holding the securing device with respect to the charging device.

Figure 7B:
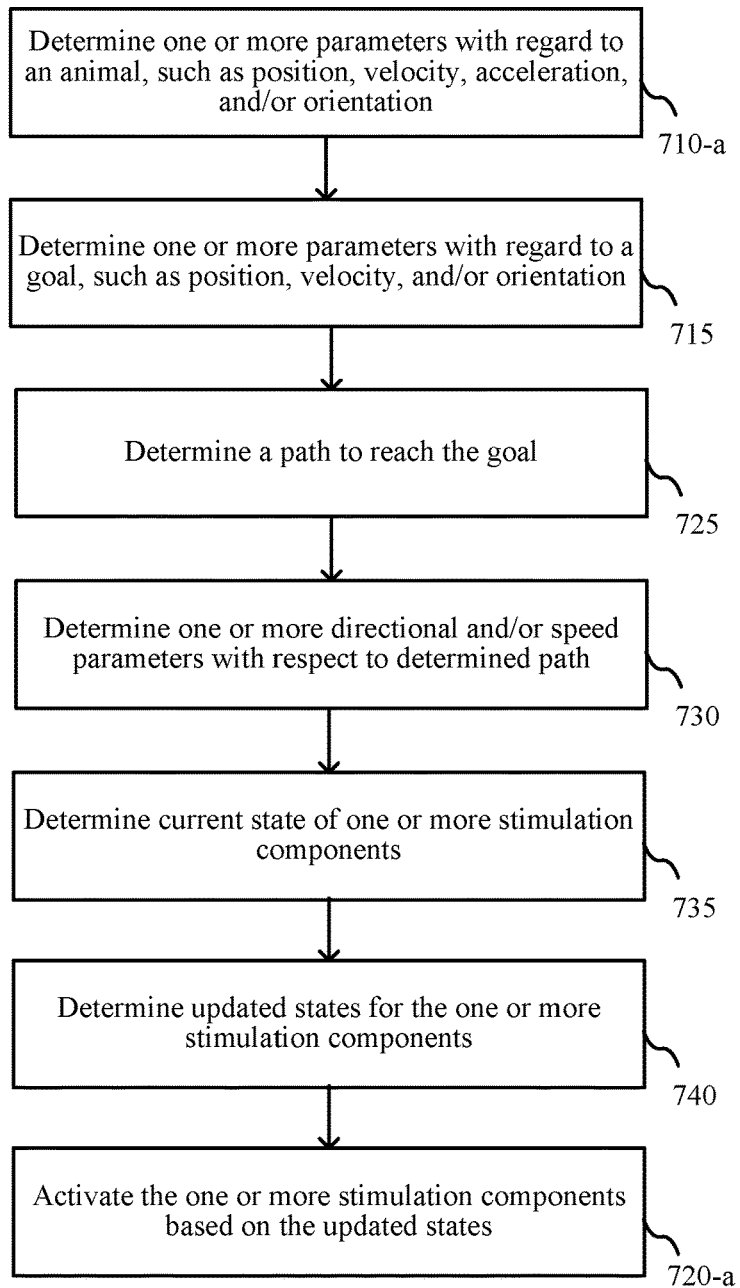
FIG. 7B shows a flow diagram of a method in accordance with various embodiments.

Turning now to FIG. 7B, a flow diagram of a method 700-a is shown in accordance with various embodiments. Method 700-a may be implemented utilizing a variety of systems and/or devices such as those shown and/or described with respect to FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, FIG. 4B, FIG. 5A, FIG. 5B, FIG. 5C, FIG. 5D, FIG. 5E, FIG. 5F, FIG. 5G, FIG. 6A, and/or FIG. 6B. Method 700-a may provide for directional control to an animal. Method 700-a may be an example of method 700 of FIG. 7A.

At block 710-a, one or more parameters with regard to the animal may be determined. These may be referred to as determined signals. The one or more parameters may include, but are not limited to, position, velocity, orientation, and/or acceleration. The one or more parameters may be with respect to an earth reference and/or local navigation reference. In some embodiments, the determined parameters may be calculated. A variety of different tools and techniques may be utilized to determine the one or more parameters, such as global positioning signals, inertial and/or magnetic field sensor data, time difference of arrival, recent measurements, and/or error estimates. In some embodiments, one or more parameters may be determined with regard to a reference system. These aspects of method 700-a may be referred to navigation aspects.

At block 715, one or more parameters with regarding a goal may be determined. These parameters may include position, velocity, and/or orientation, for example. The goal may include such things as a location to be reached. Other goals may include, but are not limited to, a specific time to reach a location, etc. At block 725, a path to reach the goal may be determined. At block 730, one or more directional and/or speed parameters with respect to the determined path may be determined. These aspects of method 700-a may be referred to as guidance aspects. In some embodiments, these aspects may be optimized, such as to find an ideal path and/or ideal state values with respect to speed, direction, etc.

At block 735, a current state of one or more stimulation components of an animal wearable device may be determined. At block 740, one or more updated states for the one or more stimulation components may be determined. At block 720-a, the one or more stimulation components may be activated based on the update state. These aspects may be referred to as control aspects of method 700-a. Some embodiments may include receiving and/or determining a current velocity and/or orientation (and/or objective speed and/or heading) of the animal wearable device and/or reference system. Merely by way of further example, the control aspects may measure the current state of the stimulation components. Using the information received from the navigation aspects about the current speed and direction, from the guidance aspects about the ideal speed and direction, and/or the measured current state of the stimulation components, the control aspects of method 700-a may determine new values for the stimulation components and may apply the stimulation to the animal.

Figure 7C:
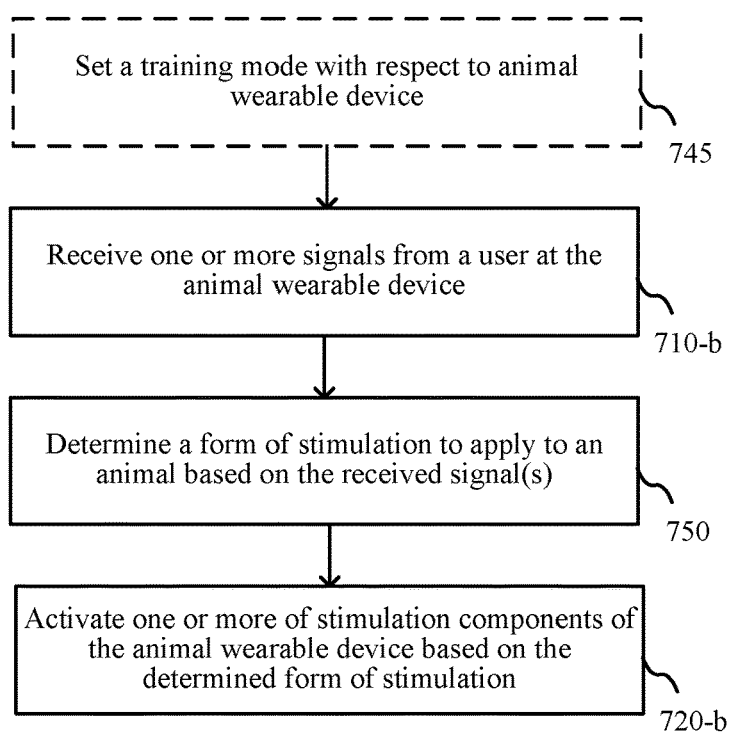
FIG. 7C shows a flow diagram of a method in accordance with various embodiments.

Turning now to FIG. 7C, a flow diagram of a method 700-b is shown in accordance with various embodiments. Method 700-b may be implemented utilizing a variety of systems and/or devices such as those shown and/or described with respect to FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, FIG. 4B, FIG. 5A, FIG. 5B, FIG. 5C, FIG. 5D, FIG. 5E, FIG. 5F, FIG. 5G, FIG. 6A, and/or FIG. 6B. Method 700-b may provide for training of an animal, for example. Method 700-b may be an example of method 700 of FIG. 7A.

At block 710-b, one or more signals from a user may be received at the animal wearable device. The training signals may be received from the user via voice commands that may be transmitted from a user device to the animal wearable device. In some embodiments, a microphone component of the animal wearable device may receive a voice command from a user as the received signal(s). In some embodiments, the user may provide the signal through the utilizing of a user device, such as through touching one or more signal buttons on a user device (such as No, Alert, Return, Good) that then be transmitted to the animal wearable device. A user may observe the animal in some situations in order to determine what signal to provide, such as observing good behavior and/or bad behavior. An animal may perform behavior that the user would like to signal to the animal with respect to how the user views such behavior.

At block 750, a form of stimulation to apply to an animal may be determined based on the received signal(s). For example, the form of stimulation may be determined that reflects a user's desire for an animal to be alerted, to return, to be rewarded or praised, and/or to be warned for undesired behavior. At block 720-b, one or more stimulation components of the animal wearable device may be activated based on the determined form of stimulation. As elsewhere described, this may include a wide variety of stimulation, utilizing one or more of the stimulation components in a variety of combinations to provide a variety of different signals to an animal. The animal may receive the stimulation from the one or more stimulation components that may reinforce the behavior and/or redirect the animal's behavior, example. The user may provide additional signals to the animal without the use of the animal wearable device in some situations, including providing rewards such as food treats, petting, or play, for example. The user's device, as part of a training program, may prompt or remind the user to provide additional signals to the animal without the use of the animal wearable device. The animal wearable device, as part of a training program, may prompt or remind the user to provide additional signals to the animal without the use of the animal wearable device.

In some embodiments, a training mode with respect to an animal wearable device may be set at block 745. The training mode may be set in a variety of ways, such as being based on settings stored in an a memory of the animal wearable device, settings received from a user device, and/or settings determined based on measured variables such as time, location, animal health, or a combination of such factors. Some training modes may be determined based on past training results that may be stored on the animal wearable device or elsewhere. As such, method 700-b may be utilized as a way to provide for adaptive training of an animal over time through multiple rounds of training.

Figure 7D:
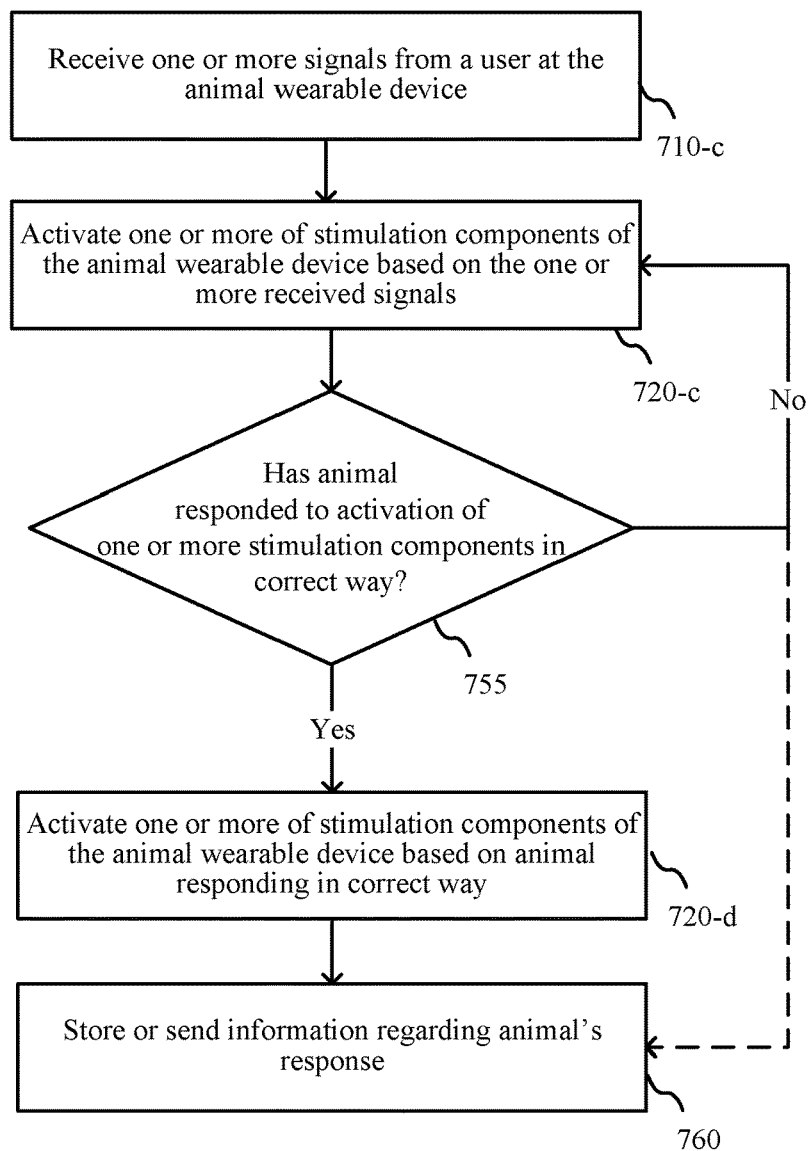
FIG. 7D shows a flow diagram of a method in accordance with various embodiments.

Turning now to FIG. 7D, a flow diagram of a method 700-c is shown in accordance with various embodiments. Method 700-c may be implemented utilizing a variety of systems and/or devices such as those shown and/or described with respect to FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, FIG. 4B, FIG. 5A, FIG. 5B, FIG. 5C, FIG. 5D, FIG. 5E, FIG. 5F, FIG. 5G, FIG. 6A, and/or FIG. 6B. Method 700-c may provide for training of an animal, such as training an animal to return, for example. Method 700-c may be adapted to a variety of different commands beyond return, such as: training the cessation barking or hissing based on a signal; training redirection from a behavior that may not be desired, such as sitting on a chair to one that is, such as sitting in an animal bed; staying in a certain place and/or position while being distracted, such as by an open door; training appropriate locations to defecate and/or urinate; training tricks such as rolling over; and/or training jobs such as going to a certain room or window and alerting for the presence or absence of a person or object. Method 700-c may be an example of method 700 of FIG. 7A.

At block 710-c, one or more signals form a user may be received and/or determined at an animal wearable device. At block 720-c, one or more stimulation components of the animal wearable device may be activated based on the one or more received signals. For example, a user may send a return command.

At block 755, it may be determined whether the animal has responded to the activation of the one or more stimulation components in a correct or appropriate way. If the animal has not responded correctly, the one or more stimulation components of the animal wearable device may be activated based on the one or more received signals; in some situations, the stimulation may be modified based on the animal not responding the correct way. If the animal responds in the correct way, such as return to the vicinity of the user, one or more stimulation components of the animal wearable device may be activated based on the animal responding in the correct way at block 720-d; this may include, for example, providing positive reinforcement through the stimulation. At block 760, information regarding the animal's response to the stimulation may be stored on a memory of the animal wearable device; in some embodiments, the information may be transmitted such as to a user device.

Figure 7E:
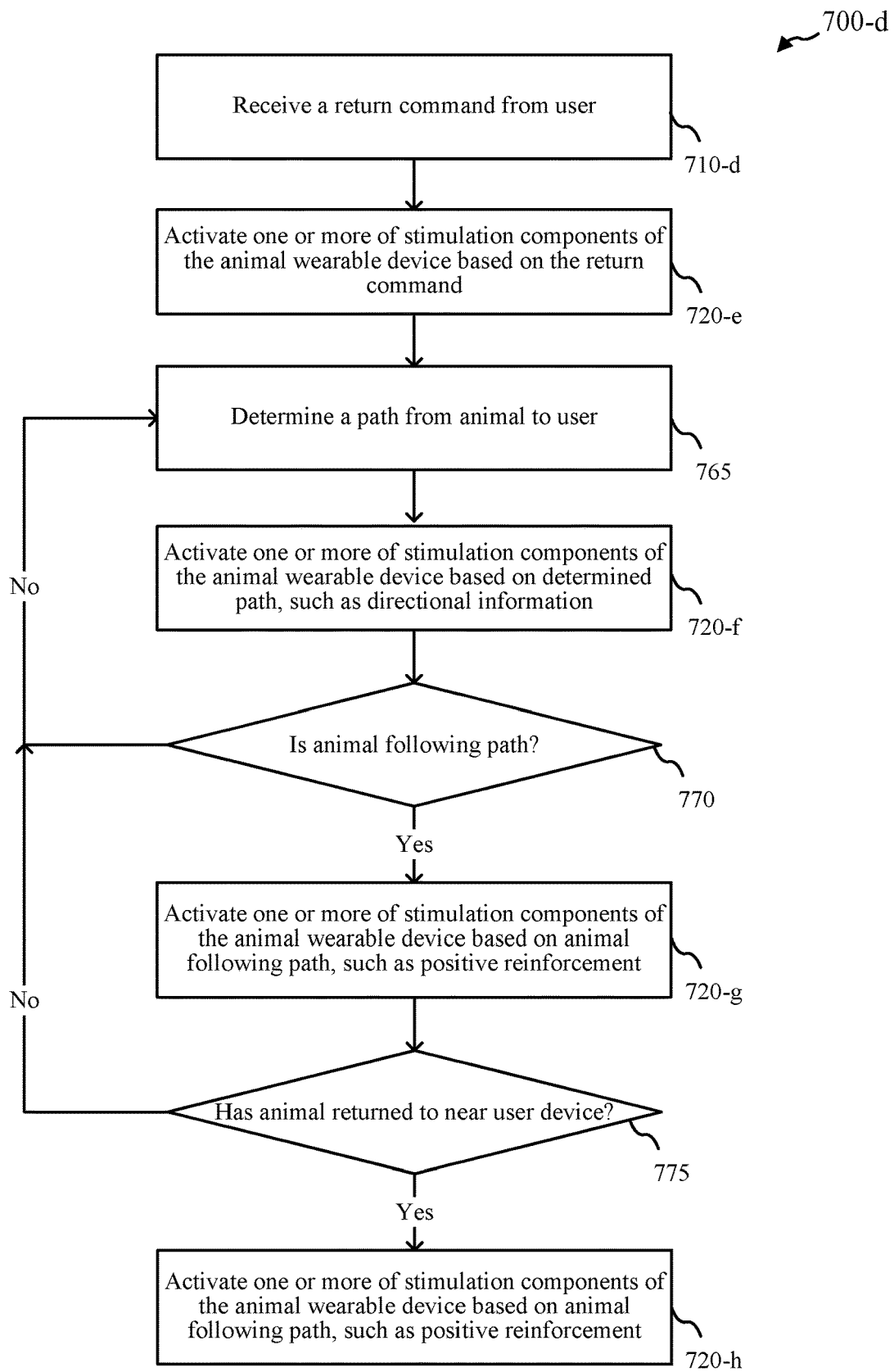
FIG. 7E shows a flow diagram of a method in accordance with various embodiments.

Turning now to FIG. 7E, a flow diagram of a method 700-d is shown in accordance with various embodiments. Method 700-d may be implemented utilizing a variety of systems and/or devices such as those shown and/or described with respect to FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, FIG. 4B, FIG. 5A, FIG. 5B, FIG. 5C, FIG. 5D, FIG. 5E, FIG. 5F, FIG. 5G, FIG. 6A, and/or FIG. 6B. Method 700-d may provide for training of an animal, such as training an animal to return with directional cueing along a determined path. Method 700-d may be an example of method 700 of FIG. 7A.

At block 710-d, a return command may be received from a user at the animal wearable device. At block 720-e, one or more stimulation components of the animal wearable device may be activated based on the return command.

At block 765, a path from the animal to user may be determined. This may be optimized, such as finding a most efficient and/or direct path from the animal's current location to the user's current location as based on a location of a user device. In some embodiments, directional vector command(s) may be determined to transmit to the animal to optimize the path. At block 720-f, one or more stimulation components of the animal wearable device may be activated based on the determined path, such as directional information.

At block 770, it may be determined whether the animal is following the path. If the animal is not following the path, the animal wearable device may return to block 765 and determine an update path followed by updated directional information to convey to the animal through the one or more stimulation components. The one or more stimulation components of the animal wearable device may be activated to further indicate to the animal that it may not be following the previous determined path. In some embodiments, the one or more stimulation components of the animal wearable device may be activated to direct the animal back towards previously determined path or the newly determined path.

If the animal is following the determined path, the one or more stimulation components of the animal wearable device may be activated based the animal following the path, such as providing positive reinforcement at block 720-g.

At block 775, it may be determined whether the animal has returned to near the user, such as to near the user's device. If the animal has not returned to the user, the animal wearable device may again return to block 765 and determine an update path followed by updated directional information to convey to the animal through the one or more stimulation components. If the animal has returned to the user, the one or more stimulation components of the animal wearable device may be activated based the animal returning to the user, such as providing positive reinforcement at block 720-h.

In some embodiments, the user need not be present. In such a case, in block 710-d, the return command may be generated from logic within the collar, such as after an animal has been in an area for a specified amount of time. In such a case, in block 765, a path may be determined to a point, such as the front door of a house. In such a case, in block 775, the animal wearable device may determine if the animal has reached the desired location. This method may allow the user to train an animal to return to the user and use similar signaling to train an animal to move to a desired point in space and time.

The user may hide rewards, such as treats or toys, and mark the location with the user device, the animal wearable device, or a combination. At a later time, with or without the owner present, the animal wearable device may direct the animal to the reward, which may reinforce the training.

Figure 7F:
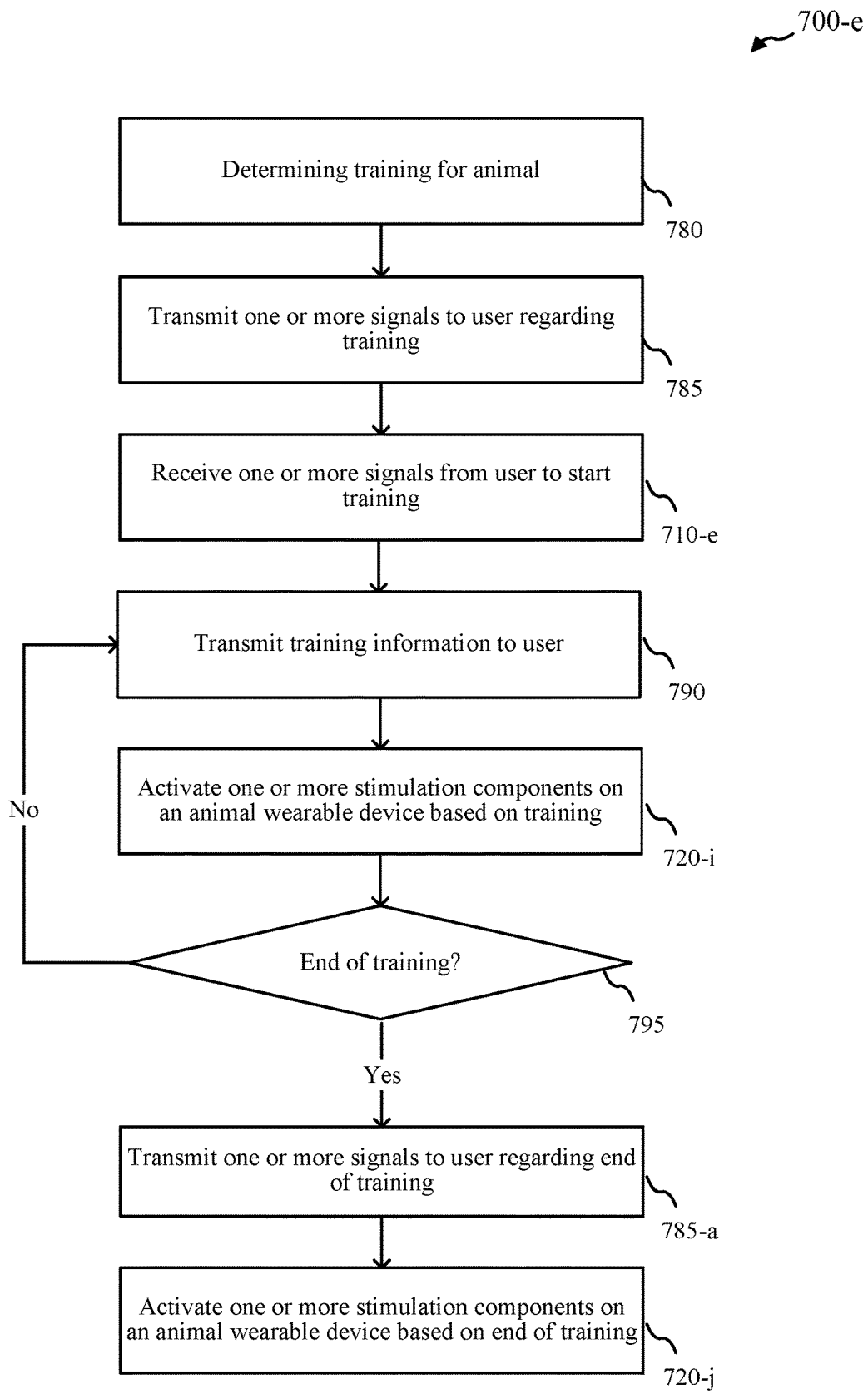
FIG. 7F shows a flow diagram of a method in accordance with various embodiments.

Turning now to FIG. 7F, a flow diagram of a method 700-e is shown in accordance with various embodiments. Method 700-e may be implemented utilizing a variety of systems and/or devices such as those shown and/or described with respect to FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, FIG. 4B, FIG. 5A, FIG. 5B, FIG. 5C, FIG. 5D, FIG. 5E, FIG. 5F, FIG. 5G, FIG. 6A, and/or FIG. 6B. Method 700-e may provide for training of an animal; in particular, method 700-e may provide training directions for a user. Method 700-e may be an example of method 700 of FIG. 7A.

At block 780, it may be determined if training should be conducted. This may be based, for example, on data stored on the animal wearable device. The data may, for example, include the occurrences, durations, and/or results of previous training sessions. Training may be determined in some cases based on guidelines for training adjusted for breed, age, and/or current abilities of the animal. Training may be determined based on time of day or week and/or health of the animal.

The determined training to be conducted may include information to transmit to the user through one or more signals of block 785. For example, the user may be instructed to gather different training materials (e.g., rewards, tools, and/or props). The user may be instructed to proceed to a training location. In some embodiments, the signal may prompt the user to start the training session after determining that the user and the animal are located near each other. Merely by way of example, the user may elect to begin a training session where the animal may be tempted with distractions while being directed to remain within a specified distance to the user.

At block 710-e, one or more signals may be received from the user to start the training. At block 790, training information may be transmitted to the user (through their user device), such as providing directions and/or other information to the user. The user may receive the directions and/or other information about the training session. At block 720-i, one or more stimulation components of the animal wearable device may be activated based on the training, such as to communicate commands, directional cues, and/or to mark different behavior (positive, negative, etc). The animal may receive training stimulation through combinations of different stimulation, such as sound, haptic, pressure, and/or light, for example.

At block 795, it may be determined if it is an appropriate time to end the training session. If it is determined to not end the training, additional training information may be transmitted to the user at block 790, followed by additional training communicated to the animal through the one or more stimulation components. If it is determined to end the training, one or more signals may be transmitted to the user regarding the end of training at block 785-a. At block 720-j, one or more of the stimulation components may be activated based on end of training. This may congratulate and/or reward the user and/or animal.

Figure 7G:
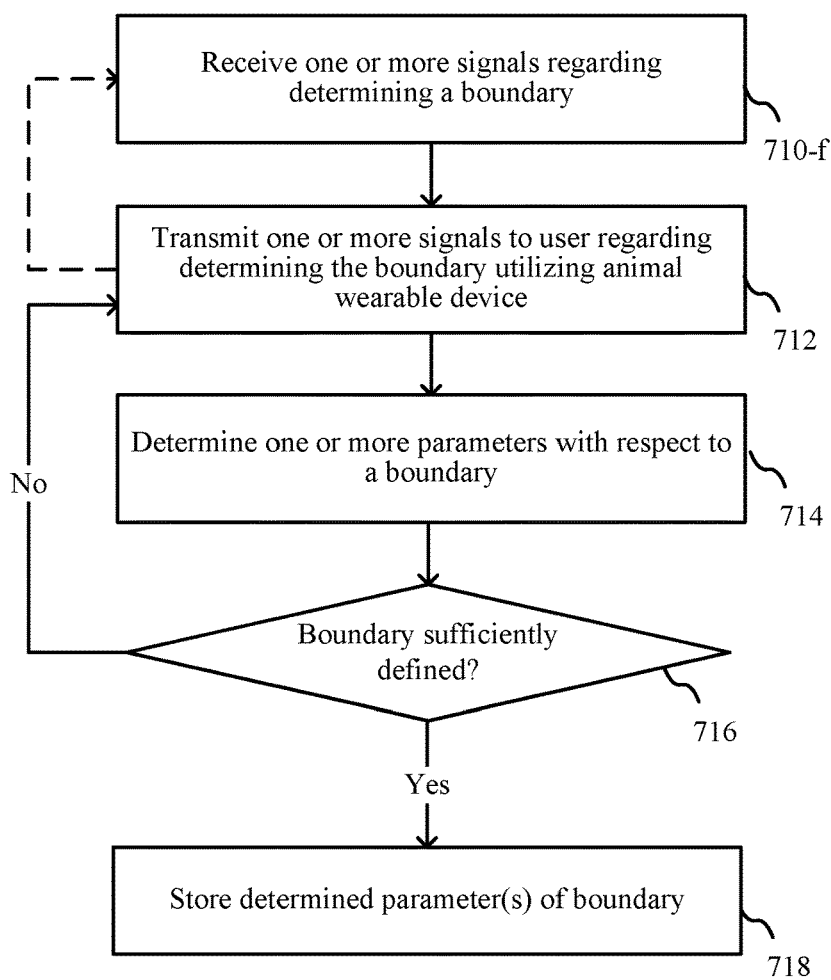
FIG. 7G shows a flow diagram of a method in accordance with various embodiments.

Turning now to FIG. 7G, a flow diagram of a method 700-f is shown in accordance with various embodiments. Method 700-c may be implemented utilizing a variety of systems and/or devices such as those shown and/or described with respect to FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, FIG. 4B, FIG. 5A, FIG. 5B, FIG. 5C, FIG. 5D, FIG. 5E, FIG. 5F, FIG. 5G, FIG. 6A, and/or FIG. 6B. Method 700-f may provide for defining a boundary in accordance with various embodiments. Method 700-f may be an example of method 700 of FIG. 7A.

At block 710-f, one or more signals may be received at an animal wearable device regarding determining a boundary. For example, a user may select an option to define a boundary using the animal wearable device for measurement. Some embodiments may determine that the animal wearable device is being worn by an animal.

At block 712, one or more signals may be transmitted to a user regarding determining boundary utilizing animal wearable device. For example, a message may be sent from the animal wearable device to a user device to prompt the user to remove the animal wearable device from the animal so that the device may be used to measure boundary parameters with precision. In some embodiments, the animal wearable device may be left on the animal while the boundary parameters may be determined. In some embodiments, the user device may prompt the user for information such as boundary type, name, and/or other relevant information. For example, the user may select a surface and name it "Dining Room Table." Another example may include the user selecting an outside animal area without a physical barrier and name it "Outside Animal Area." The one or more transmitted signals to the user regarding determining the boundary may include utilizing sounds played from speakers on the device and/or information transmitted to the user device that may instruct the user to position the animal wearable device with respect to different portions of the boundary, such as at one or more corners of the table top surface, in a particular orientation, for example; for an outside animal area, the animal wearable device may be held at different portions of the intended boundary. At block 714, one or more parameters with respect to the boundary may be determined. For example, using navigation signals, such as GPS, inertial, and/or time-differencing ranging, the animal wearable device may determine the coordinates of different points on the boundary. These parameters may be transmitted the user device in some embodiments. At block 716, it may be determined if the boundary has been sufficiently defined. If the boundary has not been sufficiently defined, additional signals may be transmitted to the user regarding determining the boundary. If the boundary has been sufficiently defined, the determine parameters of the boundary may be stored at block 718. For example, object location and type information may be stored in a memory of the animal wearable device, the user device, and/or other devices, such network devices. In some embodiments, one or more stimulation components may be activated in order to indicate to a user that the boundary has or has not been sufficiently defined.

Figure 7H:
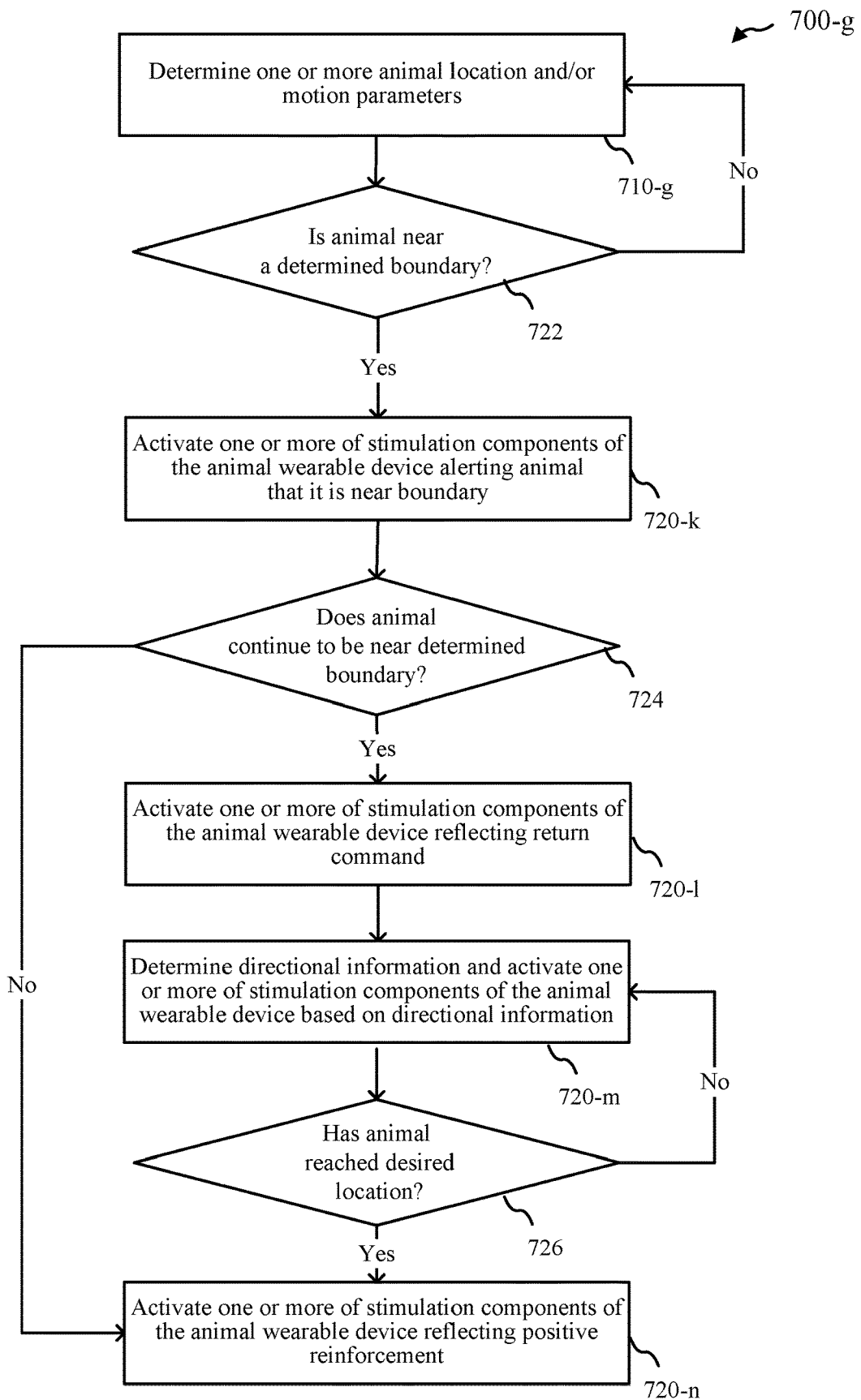
FIG. 7H shows a flow diagram of a method in accordance with various embodiments.

Turning now to FIG. 7H, a flow diagram of a method 700-g is shown in accordance with various embodiments. Method 700-g may be implemented utilizing a variety of systems and/or devices such as those shown and/or described with respect to FIG. 1A, FIG. 1B, FIG. 1C, FIG. 1D, FIG. 2A, FIG. 2B, FIG. 2C, FIG. 2D, FIG. 2E, FIG. 2F, FIG. 3, FIG. 4A, FIG. 4B, FIG. 5A, FIG. 5B, FIG. 5C, FIG. 5D, FIG. 5E, FIG. 5F, FIG. 5G, FIG. 6A, and/or FIG. 6B.

Method 700-g may provide for boundary containment for an animal, for example. Method 700-g may be an example of method 700 of FIG. 7A.

At block 710-g, one or more animal location and/or motion parameters may be determined at the animal wearable device. For example, an animal's location, speed, acceleration, and/or orientation to a boundary may be determined. At block 722, it may be determined at the animal wearable device if the animal is near a determined boundary. In some embodiments, a method such as method 700-f may be utilized to determine the boundary. If the animal is determined not be near the boundary, the animal wearable device may continue to monitor the animal's location and/or motion parameters over time. If it is determined that the animal is near a determined boundary (or determined to be approaching the determined boundary), one or more stimulation components of the animal wearable device may be activated to alert the animal that it is near a boundary at block 720-k. For example, the alert may include utilizing recorded sound the user saying the animals name utilizing one or more speakers; one or more stimulation components may provide specific haptic vibration pattern to alert he animal.

At block 724, it may be determined at the animal wearable device if the animal continues to be near the determined boundary. For example, it may be determined if the animal's continued motion with respect to the boundary may suggest redirecting the animal to prevent the animal from a boundary crossing event. If it is determined that the animal is not likely to cross the boundary, one or more stimulation components may be active reflecting positive reinforcement for the animal's behavior at block 720-n. If it is determined that the animal continues to be near the boundary and may possibly cross the boundary, one or more stimulation components may be activated reflecting a return common, for example, at block 720-l. At block 720-m, direction information may be determined and one or more stimulation components may be activated based on the directional information. In some embodiments, this may be achieved through methods such as method 700-d of FIG. 7D, for example. At block 726, it may be determined if the animal has reached a desired location based on the directional information and/or cueing. If the animal has not reached the directed location, additional direction information and stimulation may be provided based on the directional information. If the animal has reached the directed location, one or more stimulation components may be active reflecting positive reinforcement for the animals behavior at block 720-n.

These embodiments may not capture the full extent of combination and permutations of materials and process equipment. However, they may demonstrate the range of applicability of the method, devices, and/or systems. The different embodiments may utilize more or less stages than those described.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

As used in the specification, a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

As used in the specification and appended claims, directional terms, such as "top," "bottom," "left," "right," "up," "down," "upper," "lower," "proximal," "distal" and the like are used herein solely to indicate relative directions and are not otherwise intended to limit the scope of the invention or claims.

Embodiments disclosed or envisioned herein may include or utilize a special purpose or general-purpose computer including computer hardware, such as, for example, one or more processors, as discussed in greater detail below. Embodiments may also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: computer storage media and transmission media.

Computer storage media may include RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" may be defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly may view the connection as a transmission medium. Transmission media may include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., an "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions may include, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, tablets, mobile telephones, PDAs, pagers, routers, switches, and the like. Embodiments may be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entity's data center or "in the cloud."

What is claimed is:

1. A method of reward-based animal training comprising:
    determining that an animal collar is worn by an animal utilizing a computerized controller coupled with the animal collar;
    transmitting a signal from the computerized controller coupled with the animal collar to a user smart phone separate from the computerized controller coupled with the animal collar to prompt a user to remove from the animal the animal collar that is coupled with the computerized controller;
    transmitting one or more signals from the computerized controller coupled with the animal collar that is removed from the animal to the user smart phone separate from the computerized controller coupled with the animal collar to prompt the user to position the animal collar with respect to one or more portions of an object;
    measuring one or more positions of the animal collar positioned by the user with respect to the one or more portions of the object utilizing the computerized controller coupled with the animal collar that is removed from the animal;
    prompting the user using the user smart phone to provide a name of the object;
    storing the one or more positions of the animal collar with respect to the one or more portions of the object measured utilizing the computerized controller coupled with the animal collar and the name of the object on at least the computerized controller coupled with the animal collar or the user smart phone;
    attaching the animal collar to the animal after measuring the one or more positions of the animal collar positioned by the user;
    receiving a signal from the user smart phone at the computerized controller coupled with the animal collar worn by the animal, wherein the signal indicates that the animal is performing a desired behavior with respect to the one or more measured positions; receiving one ore more other signals from the user smart phone to initiate a training session for the animal controlled by the computerized controller;
    determining at the computerized controller a form of stimulation to apply to the animal based on the received signal from the user smart phone to indicate a reward to the animal;
    activating, based on the determined form of stimulation, one or more stimulation components from a plurality of stimulation components coupled with different portions of the animal collar to indicate the reward to the animal, wherein the plurality of stimulation components include a plurality of vibration components;

transmitting a signal from the computerized controller to the user smart phone to prompt the user to provide the reward to the animal;

measuring one or more responses of the animal at the computerized controller coupled with the animal collar worn by the animal, wherein the one or more responses of the animal are associated with the activating of the one or more stimulation components from the plurality of stimulation components;

comparing, at least at the computerized controller coupled with the animal collar worn by the animal or the user smart phone, the one or more measured responses of the animal with historical data corresponding to the animal; and adapting the activation, based on the comparing of the one or more measured responses of the animal with historical data corresponding to the animal, of the one or more stimulation components from the plurality of stimulation components coupled with different portions of the animal collar.

2. The method of claim 1, wherein adapting the activation, based on the comparing of the one or more measured responses of the animal with historical data corresponding to the animal, of the one or more stimulation components from the plurality of stimulation components coupled with different portions of the animal collar provide one or more directional cues.

3. The method of claim 1, wherein activating, based on the determined form of stimulation, one or more stimulation components from the plurality of stimulation components coupled with different portions of the animal collar to indicate the reward to the animal include activating the one or more stimulation components in a pattern.

4. The method of claim 3, wherein the pattern includes vibrating out-of-phase at least two vibration components from the plurality of simulation components on opposite sides of the animal.

5. The method of claim 4, wherein vibrating out-of-phase at least two vibration components from the plurality of simulation components on opposite sides of the animal includes:

activating at a first time a first stimulation component from the plurality of stimulation components at a first stimulation value without activating a second stimulation component from the plurality of stimulation components;

activating, at a second time after the first time, the first stimulation component at a second stimulation value and the second stimulation component at a third stimulation value, wherein the second stimulation value is greater than the third stimulation value;

activating, at a third time after the second time, the first stimulation component at a fourth stimulation value and the second stimulation component at the fourth stimulation value;

activating, at a fourth time after the third time, the first stimulation component at the third stimulation value and the second stimulation component and the second stimulation value; and activating, at a fifth time after the fourth time, the second stimulation component at the first stimulation value without activating the first stimulation component.

6. The method of claim 3, further comprising:
determining a change with respect to the one or more measured responses of the animal determined at the computerized controller coupled with the animal collar worn by the animal; and activating, based on the determined change with respect to the one or more measured responses of the animal, the one or more stimulation components from the plurality of stimulation components.

7. The method of claim 6, wherein determining the change with respect to the one or more measured responses of the animal includes determining a change in location of the animal collar, a change in velocity of the animal collar, a change in orientation of the animal collar, a change in time determined at the animal collar, or a change in sound determined at the animal collar.

8. The method of claim 3, further comprising:
determining a lack of change with respect to the one or more measured responses of the animal determined at the computerized controller coupled with the animal collar worn by the animal; and activating, based on the determined lack of change with respect to the one or more measured responses of the animal, the one or more stimulation components from the plurality of stimulation components.

9. The method of claim 1, wherein measuring one or more responses of the animal at the computerized controller coupled with the animal collar worn by the animal includes measuring a plurality of sound signals.

10. The method of claim 9, further comprising determining at least a distance or a direction to a sound source based on the determined plurality of sound signals.

11. The method of claim 1, further comprising:
determining one or more boundary conditions;
determining whether the one or more boundary conditions are satisfied utilizing the one or more measured responses of the animal; and
determining whether the one or more boundary conditions are satisfied to activate the one or more simulation components.

12. The method of claim 11, wherein the one or more boundary conditions include one or more time conditions.

13. The method of claim 11, wherein the one or more measured responses of the animal include at least a position, a velocity, an acceleration, or an orientation of the secured device with respect to the one or more boundary conditions.

14. The method of claim 1, wherein adapting the activation, based on the comparing of the one or more measured responses of the animal with historical data corresponding to the animal, of the one or more stimulation components from the plurality of stimulation components coupled with different portions of the animal collar directs the animal to a charging device.

15. The method of claim 14, further comprising at least charging one or more batteries coupled with the computerized controller while holding the animal collar with respect to the charging device or exchanging one or more batteries coupled with the computerized controller while holding the animal collar with respect to the charging device.

16. The method of claim 1, wherein the plurality of vibration components include a first vibration component coupled with a first portion of the animal collar and a second vibration component coupled with a second portion of the animal collar such that the first portion and the second portion are configured to be on opposites sides of the animal.

17. The method of claim 1, wherein each stimulation component from the plurality of stimulation components provides signals based on at least amplitude modulation, pulse duration, or pulse occurrence.

18. The method of claim 1, wherein measuring one or more responses of the animal at the computerized controller coupled with the animal collar worn by the animal includes determining a location of the animal collar utilizing one or more location components coupled with the computerized controller.

19. The method of claim 18, wherein activating, based on the determined form of stimulation, one or more stimulation components from the plurality of stimulation components coupled with different portions of the animal collar to indicate the reward to the animal includes coordinating the activation of the one or more stimulations components with each other to provide a pattern based on the location determined with the one or more location components.

20. The method of claim 1, wherein measuring one or more responses of the animal at the computerized controller coupled with the animal collar includes determining a motion of the animal collar utilizing one or more motion components coupled with the computerized controller.

21. The method of claim 20, wherein activating, based on the determined form of stimulation, one or more stimulation components from the plurality of stimulation components coupled with different portions of the animal collar to indicate the reward to the animal includes coordinating the plurality of stimulation components with each other to provide a pattern based on the motion determined with the one or more motion components.

22. The method of claim 1, further comprising:
determining a training session at the computerized controller coupled with the animal collar worn by the animal; and
transmitting one or more other signals from the computerized controller to the user smart phone to prompt the user to gather one or more training materials for the training session.

23. The method of claim 1, wherein measuring the one or more positions of the animal collar positioned by the user with respect to the one or more portions of the object utilizing the computerized controller coupled with the animal collar that is removed from the animal includes:
utilizing the computerized controller coupled with the animal collar that is removed from the animal and positioned by the user to measure a location of a reward that the user hides:
and further comprising:
utilizing one or more stimulation components from the plurality of stimulation components coupled with different portions of the animal collar to direct the animal to the reward that the user hid at the measured location of the reward utilizing the computerized controller coupled with the animal that was removed from the animal.

24. The method of claim 1, wherein:
transmitting the one or more signals from the computerized controller coupled with the animal collar that is removed from the animal to the user smart phone separate from the computerized controller coupled with the animal collar to prompt the user to position the animal collar with respect to the one or more portions of an object includes:
transmitting one or more signals from the computerized controller coupled with the animal collar that is removed from the animal to the user smart phone separate from the computerized controller coupled with the animal collar to prompt the user to position the animal collar with respect to a plurality of corners of a piece of furniture; and
measuring the one or more positions of the animal collar positioned by the user with respect to the one or more portions of the object utilizing the computerized controller coupled with the animal collar that is removed from the animal includes:
measuring a plurality of positions of the animal collar positioned by the user with respect to the plurality of corners of the piece of furniture utilizing the computerized controller coupled with the animal collar that is removed from the animal.

25. The method of claim 1, further comprising:
determining that at least one position from the one or more positions of the animal collar is insufficiently defined; and
activating one or more stimulation components from the plurality of stimulation components indicating that the at one position from the one of the one or more positions of the animal collar are insufficiently defined.

26. A method of reward-based animal training comprising: determining that an animal collar is worn by an animal utilizing a computerized controller coupled with the animal collar;
transmitting a signal from the computerized controller coupled with the animal collar to a user smart phone separate from the computerized controller coupled with the animal collar to prompt a user to remove from the animal the animal collar that is coupled with the computerized controller;
transmitting one or more signals from the computerized controller coupled with the animal collar that is removed from the animal to the user smart phone separate from the computerized controller coupled with the animal collar to prompt the user to position the animal collar with respect to a reward that the user hides;
utilizing the computerized controller coupled with the animal collar that is removed from the animal and positioned by the user to measure a location of the reward that the user hides;
prompting the user using the user smart phone to provide a name of the reward;
storing the location of the reward measured utilizing the computerized controller coupled with the animal collar and the name of the reward on at least the computerized controller coupled with the animal collar or the user smart phone; attaching the animal collar to the animal after measuring the location of the reward that the user hid;
utilizing one or more stimulation components from a plurality of stimulation components coupled with different portions of the animal collar to direct the animal to the reward that the user hid at the measured location of the reward utilizing the computerized controller coupled with the animal collar that was removed from the animal;
receiving a signal from the user smart phone at the computerized controller coupled with the animal collar worn by the animal, wherein the signal indicates that the animal is performing a desired behavior;
determining at the computerized controller a form of stimulation to apply to the animal based on the received signal from the user smart phone to indicate a reward to the animal;
activating, based on the determined form of stimulation, one or more stimulation components from the plurality of stimulation components coupled with different portions of the animal collar to indicate the reward to the animal, wherein the plurality of stimulation components include a plurality of vibration components;

transmitting a signal from the computerized controller to the user smart phone to prompt the user to provide the reward to the animal;

measuring one or more responses of the animal at the computerized controller coupled with the animal collar worn by the animal, wherein the one or more responses of the animal are associated with the activating of the one or more stimulation components from the plurality of stimulation components;

comparing, at least at the computerized controller coupled with the animal collar worn by the animal or the user smart phone, the one or more measured responses of the animal with historical data corresponding to the animal; and adapting the activation, based on the comparing of the one or more measured responses of the animal with historical data corresponding to the animal, of the one or more stimulation components from the plurality of stimulation components coupled with different portions of the animal collar.

27. A method of reward-based animal training comprising: determining that an animal collar is worn by an animal utilizing a computerized controller coupled with the animal collar;

transmitting a signal from the computerized controller coupled with the animal collar to a user smart phone separate from the computerized controller coupled with the animal collar to prompt a user to remove from the animal the animal collar that is coupled with the computerized controller;

transmitting one or more signals from the computerized controller coupled with the animal collar that is removed from the animal to the user smart phone separate from the computerized controller coupled with the animal collar to prompt the user to position the animal collar with respect to a plurality of corners of a piece of furniture;

measuring a plurality of positions of the animal collar positioned by the user with respect to the plurality of corners of the piece of furniture utilizing the computerized controller coupled with the animal collar that is removed from the animal;

prompting the user using the user smart phone to provide a name of the object;

storing the one or more positions of the animal collar with respect to the one or more portions of the object measured utilizing the computerized controller coupled with the animal collar and the name of the object on at least the computerized controller coupled with the animal collar or the user smart phone;

attaching the animal collar to the animal after measuring the plurality of measured positions of the animal collar;

receiving a signal from the user smart phone at the computerized controller coupled with the animal collar worn by the animal, wherein the signal indicates that the animal is performing a desired behavior with respect to the plurality of measured positions of the animal collar;

determining at the computerized controller a form of stimulation to apply to the animal based on the received signal from the user smart phone to indicate a reward to the animal;

activating, based on the determined form of stimulation, one or more stimulation components from a plurality of stimulation components coupled with different portions of the animal collar to indicate the reward to the animal, wherein the plurality of stimulation components include a plurality of vibration components;

transmitting a signal from the computerized controller to the user smart phone to prompt the user to provide the reward to the animal;

measuring one or more responses of the animal at the computerized controller coupled with the animal collar worn by the animal, wherein the one or more responses of the animal are associated with the activating of the one or more stimulation components from the plurality of stimulation components;

comparing, at least at the computerized controller coupled with the animal collar worn by the animal or the user smart phone, the one or more measured responses of the animal with historical data corresponding to the animal; and adapting the activation, based on the comparing of the one or more measured responses of the animal with historical data corresponding to the animal, of the one or more stimulation components from the plurality of stimulation components coupled with different portions of the animal collar.

* * * * *